US008419391B2

(12) United States Patent
Inoue

(10) Patent No.: US 8,419,391 B2
(45) Date of Patent: Apr. 16, 2013

(54) HIGH PRESSURE PUMP

(75) Inventor: Hiroshi Inoue, Anjo (JP)

(73) Assignee: Denso Corporation, Kariya (JP)

( * ) Notice: Subject to any disclaimer, the term of this patent is extended or adjusted under 35 U.S.C. 154(b) by 356 days.

(21) Appl. No.: 12/938,619

(22) Filed: Nov. 3, 2010

(65) Prior Publication Data

US 2011/0110809 A1 May 12, 2011

(30) Foreign Application Priority Data

Nov. 9, 2009 (JP) ................................ 2009-256378
Feb. 25, 2010 (JP) ................................ 2010-40147
Aug. 3, 2010 (JP) ................................ 2010-174292

(51) Int. Cl.
*F04B 11/00* (2006.01)
*F01B 31/00* (2006.01)
*F01B 29/00* (2006.01)
*F16L 55/04* (2006.01)
*F02M 63/00* (2006.01)

(52) U.S. Cl.
USPC .................. 417/540; 92/86; 92/143; 138/26; 123/447

(58) Field of Classification Search .................. 417/470, 417/540; 92/86, 143; 60/469; 138/26, 28; 123/446, 447
See application file for complete search history.

(56) References Cited

U.S. PATENT DOCUMENTS 6,805,105 B2 * 10/2004 Kato et al. .................... 123/514
7,401,594 B2 * 7/2008 Usui et al. .................... 123/467
7,604,462 B2 10/2009 Inoue
7,635,257 B2 12/2009 Inoue
8,052,404 B2 11/2011 Inoue
8,052,405 B2 11/2011 Inoue
2008/0289713 A1 * 11/2008 Munakata et al. .............. 138/26
2009/0097997 A1 * 4/2009 Suzuki et al. ................. 417/470

FOREIGN PATENT DOCUMENTS

JP S55-120877 8/1980
JP 8-261097 10/1996
JP 11-303755 11/1999
JP P2000-240530 A 9/2000
JP P2006-200407 A 8/2006
JP 2008-2361 1/2008
JP 2008-525713 7/2008

OTHER PUBLICATIONS

Japanese Office Action dated Dec. 13, 2011, issued in corresponding Japanese Application No. 2010-174292 with English translation.

* cited by examiner

*Primary Examiner* — Charles Freay
(74) *Attorney, Agent, or Firm* — Nixon & Vanderhye PC

(57) ABSTRACT

A fuel gallery has a first opening port communicated to a variable volume chamber formed at a lower side of a plunger and a second opening port communicated to a fuel pressurizing chamber formed at an upper side of the plunger. A connecting tube member is provided in the fuel gallery for communicating the first and second opening ports with each other. During a fuel amount adjusting stroke, for example, in which the plunger is moved in an upward direction, a part of excessive fuel from the fuel pressurizing chamber is supplied to the variable volume chamber through the connecting tube member and the remaining part of the excessive fuel is discharged from the connecting tube member into the fuel gallery through a communication through-hole formed in the connecting tube member.

24 Claims, 19 Drawing Sheets

HIGH PRESSURE PUMP

CROSS REFERENCE TO RELATED APPLICATION

This application is based on Japanese Patent Application No. 2009-256378 filed on Nov. 9, 2009, No. 2010-040147 filed on Feb. 25, 2010 and No. 2010-174292 filed on Aug. 3, 2010, the disclosures of which are incorporated herein by reference.

FIELD OF THE INVENTION

The present invention relates to a high pressure pump, according to which pressure pulsation of fluid is decreased.

BACKGROUND OF THE INVENTION

A high pressure pump is conventionally known in the art, according to which liquid fuel is supplied by a low pressure pump from a fuel tank to the high pressure via a fuel line, the fuel is pressurized by a reciprocal movement of a plunger operated by a rotation of a cam shaft, and such pressurized fuel is pumped out by the high pressure pump to a side of fuel injectors.

A pumping operation of the high pressure pump for pressurizing the fuel is composed of a suction stroke for sucking the fuel from a fuel gallery of the pump into a fuel pressurizing chamber when the plunger is moved from its top dead center toward a bottom dead center, a fuel amount adjusting stroke for returning a part of the fuel to the fuel gallery when the piston is moved from the bottom dead center toward the top dead center, and a pressurizing stroke for pressurizing the fuel when the plunger is further moved toward the top dead center after a suction valve is closed.

During the fuel amount adjusting stroke, that is, an initial stage of an upward movement of the plunger, a part of the fuel is returned from the fuel pressurizing chamber into the fuel gallery formed on a fuel suction side, so that the fuel amount to be pumped out from the high pressure pump to the side of the fuel injectors is controlled. During such fuel return, pressure pulsation may be generated in the fuel gallery. The pressure pulsation may be propagated to a fuel pipe for supplying fuel from the low pressure pump to the high pressure pump, or to the low pressure pump. As a result, unnecessary vibration and/or noises may be generated. In a conventional high pressure pump, for example, a pulsation damper is provided in the fuel gallery in order to decrease the pressure pulsation.

According to a prior art high pressure pump, for example, as disclosed in International Patent Publication No. 2008-525713 (published in Japan), a volume compensating chamber and a pressure attenuating device are described in order to decrease the pressure pulsation, for example, in paragraphs [0021] and [0022] thereof. According to this prior art, an annular stepped portion 48 defines a volume compensating chamber 94 which is separated from a working chamber 38, and the volume compensating chamber 94 is communicated to a space for a volume control valve 26 on a fuel suction side which is separated from the working chamber 38.

According to another prior art, for example, as disclosed in Japanese Patent Publication No. 2008-002361, a high pressure pump has a plunger with a large-diameter portion and a small-diameter portion.

According to a further prior art, for example, as disclosed in Japanese Patent Publication No. 2008-286144 (corresponding to US 2008/0289713 A1), fuel from a fuel inlet is drawn by reciprocating of a plunger into a fuel pressurizing chamber through an intake valve mechanism, which is provided at an inlet of the fuel pressurizing chamber. The fuel pressurized in the fuel pressurizing chamber is discharged through an expelling valve mechanism, which is provided at an outlet of the fuel pressurizing chamber. A damper housing part is disposed at an intermediate point of a fuel channel between the fuel inlet and the intake valve mechanism.

According to the above prior arts, a variable volume chamber, which is formed at an opposite side of a plunger to a fuel pressurizing chamber, is communicated to a fuel gallery. And a pulsation damper having a specified shape is accommodated in the fuel gallery communicated with a suction valve, so as to absorb pressure pulsation.

However, the above prior arts disclose nothing more than the pulsation damper in the fuel gallery in order to decrease the pressure pulsation. According to the prior arts, the pressure pulsation is decreased to some extent. It is, however, not a satisfactory level.

According to the above prior arts, the variable volume chamber is communicated with the fuel gallery. Since the fuel pressurizing chamber and the variable volume chamber are defined by the same plunger, the volume changes take place in phase, that is, in a conjugated relation. The variable volume chamber is used in a supplementary manner when the fuel is sucked into and/or discharged from the fuel pressurizing chamber through the fuel gallery.

Since apart (a small-diameter portion) of the plunger extends through the variable volume chamber, the volume change of the variable volume chamber is not the same to that in the reversed phase of the fuel pressurizing chamber. Therefore, the variable volume chamber may play only a supplementary role in absorbing excessive amount of the fuel from the fuel pressurizing chamber. In other words, the variable volume chamber can not absorb 100% of the excessive amount of the fuel from the fuel pressurizing chamber during the fuel amount adjusting stroke.

SUMMARY OF THE INVENTION

The present invention is made in view of the above problems. It is an object of the present invention to provide a high pressure pump, according to which a performance of decreasing a pressure pulsation is increased.

According to a high pressure pump of the present invention, fuel flows from a low pressure pump to a fuel pressurizing chamber of the high pressure pump through a fuel inlet port, a fuel gallery, and a fuel passage way having a suction valve on its way. Then, the fuel is discharged from a fuel outlet having a fuel outlet valve.

The fuel is pressurized in the fuel pressurizing chamber. A volume change of the fuel pressurizing chamber is generated by a large-diameter portion of a plunger. The plunger has a small-diameter portion integrally formed with the large-diameter portion at an opposite side of the fuel pressurizing chamber. The fuel pressurized in the fuel pressurizing chamber is pumped out from the fuel outlet having the fuel outlet valve.

A variable volume chamber is formed around the small-diameter portion together with a related part of a housing. The variable volume chamber is communicated with an opening port (a first opening port) opening to the fuel gallery. When the volume of the fuel pressurizing chamber is decreased by a movement of the plunger during a fuel amount adjusting stroke and a pressurizing stroke, the volume of the variable volume chamber is increased. As a result, a part of the fuel is supplied from the fuel gallery to the variable volume chamber. On the other hand, when the volume of the fuel pressurizing chamber is increased by the movement of the plunger during a suction stroke, the volume of the variable volume chamber is decreased. Therefore, a part of the fuel is supplied from the variable volume chamber to the fuel gallery.

Namely, during the suction stroke, not only from the fuel inlet port but also from the (first) opening port connected to the variable volume chamber, the fuel is supplied into the fuel gallery and further introduced into the fuel pressurizing chamber through another (second) opening port connected to the fuel pressurizing chamber.

The high pressure pump according to the present invention has a connecting tube member provided in the fuel gallery for communicating the first and second opening ports with each other. A communication through-hole is formed at the connecting tube member in order not to separate an inside of the connecting tube member from the fuel gallery but to communicate the inside of the connecting tube member and the fuel gallery with each other.

According to the above feature, during the fuel amount adjusting stroke, the suction valve is maintained in its valve opened condition, the volume of the fuel pressurizing chamber is decreased and the volume of the variable volume chamber is increased. As a result, a part of the fuel in the fuel pressurizing chamber is supplied into the variable volume chamber through the fuel passage way having the suction valve (which is in the valve opened condition), the second opening port, the connecting tube member, and the first opening port. At the same time, another part of the remaining fuel in the fuel pressurizing chamber is supplied into the fuel gallery through the fuel passage way having the suction valve (which is in the valve opened condition), the second opening port, the connecting tube member, and the communication through-hole.

According to a conventional high pressure pump, all of the excessive fuel, which flows out from the fuel pressurizing chamber and passes through the suction valve and which corresponds to a volume change (a volume decrease) of the fuel pressurizing chamber, is supplied into the fuel gallery during the fuel amount adjusting stroke. At the same time, a part of the fuel, an amount of which corresponds to a volume change (a volume increase) of the variable volume chamber, is drawn from the fuel gallery into the variable volume chamber through the first opening port. Namely, all (100%) of the excessive fuel is supplied into the fuel gallery and the part of the excessive fuel is discharged from the fuel gallery into the variable volume chamber. Therefore, a relatively large pressure pulsation is generated.

According to the present invention, however, a part of the excessive fuel, the amount of which corresponds to the volume increase of the variable volume chamber, is directly supplied into the variable volume chamber through the connecting tube member provided in the fuel gallery, that is, without being supplied into the fuel gallery. As a result, the pressure pulsation in the fuel gallery can be suppressed to a smaller value.

In addition, the communication through-hole is formed in the connecting tube member in order not to separate the inside of the connecting tube member from the fuel gallery but to communicate the inside of the connecting tube member to the fuel gallery. Accordingly, during the fuel amount adjusting stroke, the remaining amount of the excessive fuel, which corresponds to a difference of the volume changes between the fuel pressurizing chamber and the variable volume chamber, may be gradually supplied into the fuel gallery through the communication through-hole. Therefore, the connecting tube member may not be in danger for expansion and being damaged. On the contrary, during the suction stroke, the fuel can be supplied from the variable volume chamber into the fuel pressurizing chamber through the connecting tube member, it may be possible to avoid such a situation in which an amount of suction fuel may come short.

When the high pressure pump is operated at a high speed, fuel flow discharged from the fuel pressurizing chamber has a high flow speed, in other words, a high energy. This high flow speed is one of factors for the pressure pulsation. According to the present invention, however, the fuel discharged from the fuel pressurizing chamber flows through the connecting tube member into the variable volume chamber, and the part of the fuel flows into the fuel gallery through the communication through-hole. During such a process, the fuel flow loses its energy in collision with the inside of the connecting tube member and/or the variable volume chamber, so that the flow speed of the fuel is decreased. As a result, the pressure pulsation in the fuel gallery is suppressed.

As above, according to the high pressure pump, the performance for decreasing the pressure pulsation can be increased in addition to pulsation attenuating effects of the fuel gallery and the pulsation damper.

According to the conventional high pressure pump, the first opening port communicated to the variable volume chamber is directly opened to the fuel gallery. Therefore, when the first opening port, which is opened to the fuel gallery and communicated to the variable volume chamber, is provided at a place close to the fuel inlet port, the fuel discharged from the variable volume chamber into the fuel gallery may be likely to flow into the fuel inlet port. This may be one of factors for generating noises and/or vibration. According to the present invention, however, the connecting tube member is provided and the communication through-hole formed in the connecting tube member is located at a position far away from the fuel inlet port, so that the fuel is prevented from directly flowing into the fuel inlet port. As a result, the generation of the noises and/or vibration may be suppressed.

During the suction stroke, the fuel discharged from the variable volume chamber flows toward the suction valve through the first opening port (connected to the variable volume chamber) and the connecting tube member, while the fuel from the fuel pipe also flows towards the suction valve through the fuel inlet port, the fuel gallery, and the communication through-hole formed in the connecting tube member. As above, the two fuel flows are directed into the fuel pressurizing chamber without interference to each other.

Furthermore, according to the conventional high pressure pump, streaming movement of the fuel in the fuel gallery is increased by the fuel discharged from the first opening port (connected to the variable volume chamber) in accordance with the movement of the plunger. When the streaming movement of the fuel is increased at an area neighboring to the fuel inlet port, it may be in danger of blocking the fuel flow, along which the fuel flows from the fuel pipe into the fuel inlet port. According to the present invention, however, the pressure pulsation in the fuel gallery can be suppressed by the connecting tube member, even when the plunger is operated (reciprocated) at a high speed. Accordingly, the pulsation, the vibration and so on at the fuel pipe can be decreased.

According to a further feature of the invention, for example, as defined in the claim 2, the communication through-hole may be preferably formed in the connecting tube member at a position closer to the second opening port which is connected to the fuel pressurizing chamber, and the communication through-hole may be preferably directed in such a direction other than a direct direction, in which the communication through-hole faces to the fuel inlet port opening to the fuel gallery. According to such a feature, the fuel flow discharged from the communication through-hole may hardly have a direct impact to a pulsation damper, which is arranged above the connecting tube member, and/or to the fuel inlet port.

Therefore, when compared with the case in which the fuel is directly discharged from the fuel pressurizing chamber into the fuel gallery, a behavior of the pulsation damper may not be harmed by the fuel flow of the discharged fuel and thereby the generation of the pressure pulsation can be prevented. Furthermore, it is possible to avoid such a situation, in which the discharged fuel may swiftly get out into the fuel pipe through the fuel inlet port, or the pressure pulsation may be propagated to the fuel pipe or to a pipe supporting member, or the fuel pipe may be vibrated to generate abnormal noise, or the pipe supporting member may be damaged, and so on. In addition, since the communication through-hole may be preferably formed in the connecting tube member at the position closer to the second opening port (which is connected to the fuel pressurizing chamber), it is possible to improve response of the fuel, which flows into the fuel pressurizing chamber during the suction stroke.

According to the conventional high pressure pump, since the first opening port connected to the variable volume chamber is opened to the fuel gallery at a position close to the fuel inlet port, the fuel from the variable volume chamber having a high fuel flow speed is in a danger of directly flowing into the fuel inlet port. According to the present invention (for example, as defined in the claim 2), however, the communication through-hole may be formed in the connecting tube member at a position away from the fuel inlet port. The generation of the pressure pulsation can be further suppressed.

According to a further feature of the invention, for example, as defined in the claim 3, the connecting tube member has a curved portion in a fuel flow direction, and the communication through-hole is formed in a wall of the connecting tube member other than an outer-side wall of the curved portion.

The fuel pressure at the outer-side wall of the curved portion is higher than that at the other portion, when the fuel flows through the connecting tube member. Therefore, the amount of fuel, which may flow out through the communication through-hole, may be increased, if the communication through-hole is formed at the outer-side wall of the curved portion. This means that the amount of fuel not flowing into the variable volume chamber but into the fuel gallery would be increased. The effect for suppressing the pressure pulsation may be decreased.

Accordingly, when the communication through-hole is formed in an inner-side wall or a side wall of the curved portion, the generation of the pressure pulsation can be advantageously suppressed. This is because a time difference is generated in the propagation of the pressure pulsation.

According to a further feature of the invention, for example, as defined in the claim 4 or 5, the communication through-hole has a cross section of a rectangular shape, or the communication through-hole is composed of multiple slit-shaped holes.

The rectangular shape may also include such a shape almost close to the rectangular shape. In other words, an angle of each corner may not be strictly limited to 90 degrees, a quadrangle may have a rounded corner, and so on. The slit-shaped holes should not be limited to a rectangular hole but a long hole may be included in the definition of the slit-shaped hole.

According to a further feature of the invention, for example, as defined in the claim 6, the communication through-hole has an axis inclined at a predetermined angle with respect to a line perpendicular to a surface of the wall of the connecting tube member. It may be possible to change the inclined angle in order to decrease fluid flow resistance for the fuel when the fuel flows out from the connecting tube member into the fuel gallery. Furthermore, it may be possible to change the inclined angle so that the fuel from the second opening port (connected to the fuel pressurizing chamber) may be suppressed from directly flowing out into the fuel gallery.

The position as well as the inclined angle for the communication through-hole may be decided based on the amount and speed of the fuel to be discharged into the fuel gallery, the position of the fuel inlet port and so on, wherein interference of the fuel flow and direction of the pulsation generated are taken into consideration in hydrodynamic viewpoints.

According to a further feature of the invention, for example, as defined in the claim 7, a large-diameter recessed portion is formed at one of the first and second opening ports of the housing, so that one of outer ends of the connecting tube member is inserted into an inner wall of the recessed portion until a forward end of the connecting tube member is brought into contact with a stepped portion formed at a bottom of the recessed portion.

Alternatively, according to a further feature of the invention, for example, as defined in the claim 8, a pipe-shaped projection is formed at one of the first and second opening ports of the housing, so that the pipe-shaped projection is inserted into one of inner ends of the connecting tube member until a forward end of the connecting tube member is brought into contact with a stepped portion formed at a bottom around the pipe-shaped projection.

According to the above feature, variation of the insertion depth may be suppressed, when one end of the connecting tube member is inserted into the opening port or when the pipe-shaped projection is inserted into the one end of the connecting tube member. As a result, the arrangement of the connecting tube member in the pump becomes more stable.

When it is supposed that a portion of an inner wall of the connecting tube member may be broken and thereby an extraneous material may be generated, the modification in which the pipe-shaped projection is inserted into the end of the connecting tube member may be more advantageous than the modification in which the one end of the connecting tube member is inserted into the opening port, in view of preventing the extraneous material from getting mixed with the fuel in the variable volume chamber.

The large-diameter recessed portion or the pipe-shaped projection may be integrally formed with the housing. However, according to a further feature of the invention, for example, as defined in the claim 9, a pipe member, which is formed as a separate part from the housing, may be inserted at its one end into one of the first and second opening ports of the housing, and the other end of the pipe member may be inserted into an inner wall of the connecting tube member. As a result that the pipe member is made as the separate part from the connecting tube member and the housing, it becomes easier to increase accuracy of processing dimension and surface roughness at the upper and lower ends of the pipe member, each of which is inserted into the connecting tube member and the passageway (the opening port) of the housing. In addition, sealing performance as well as working property may be increased. Furthermore, it becomes easier to respond to any design change of the connecting tube member.

According to a further feature of the invention, for example, as defined in the claim 10, the pipe member may be preferably made of elastic material, so that the pipe member may absorb variation of processing dimension for the housing and the connecting tube member.

According to a further feature of the invention, for example, as defined in the claim 11, the pipe member may have an elastically deforming portion for decreasing flow speed of fuel flowing through the pipe member. The elastically deforming portion may be elastically deformed depending on the fuel flow from the variable volume chamber to the fuel pressurizing chamber during the suction stroke or the fuel flow from the fuel pressurizing chamber to the variable volume chamber during the fuel amount adjusting stroke, so as to ensure a necessary fuel flow area. The fuel flow elastically deforms the elastically deforming portion by its flow energy. As a result, the fuel loses its energy of movement and the flow speed of the fuel is decreased. Therefore, the fuel may slowly flow through the connecting tube member and the fuel may be slowly discharged from the connecting tube member into the fuel gallery, so that the pressure pulsation in the fuel gallery can be suppressed.

According to a further feature of the invention, for example, as defined in the claim 12, a concave-convex surface may be formed at an inner surface of the connecting tube member. When the fuel flow runs against the inner surface having the concave-convex surface, a vortex flow may be generated and at the same time the energy of movement of the fuel may be lost, and finally the flow speed of the fuel may be decreased. As a result, the fuel may slowly flow through the connecting tube member and the fuel may be slowly discharged from the connecting tube member into the fuel gallery, so that the pressure pulsation in the fuel gallery may be suppressed.

According to a still further feature of the present invention, for example, as defined in the claim 13, a high pressure pump has a basic structure identical to that of the claim 1. It differs from the invention defined in the claim 1 in that the first opening port (connected to the variable volume chamber) and the second opening port (connected to the fuel pressurizing chamber) may be communicated with each other by a communication passage formed at an outside of the fuel gallery.

According to the high pressure pump, for example, as defined in the claim 13, a bypass member is provided so that the first and second opening ports are communicated with each other through a bypass passage. A communication passage may be formed at an intermediate position of the bypass passage between the first and second opening ports so that the inside and the outside of the fuel gallery are communicated with each other.

According to a still further feature of the present invention, for example, as defined in the claim 14, a separation plate may be provided in the communication passage so that the fuel gallery is separated from the bypass passage, and the communication through-hole is formed in the separation plate so that the fuel gallery is communicated with the bypass passage through the communication through-hole.

The bypass member may be formed at the outside of the housing. The bypass member may be made of a flexible or a rigid tube member. According to the structure of the present embodiment, there are less constrains in terms of a space, when compared with the case in which the connecting tube member is provided in the fuel gallery. Therefore, it has higher design flexibility. In addition, it becomes much easier to carry out maintenance work.

According to a still further feature of the present invention, for example, as defined in the claim 15, the housing has a groove formed at a bottom of the fuel gallery of the housing so as to form a fuel communication passage for communicating the first and second opening ports with each other. A separation plate is provided at an upper opening portion of the groove to thereby separate the fuel communication passage from the fuel gallery. A communication through-hole is formed in the separation plate so that the fuel communication passage is communicated to the fuel gallery through the communication through-hole.

According to the above feature, a number of assembling process can be reduced when compared with the case in which the fuel communication passage is formed by the connecting tube member or the bypass member. In addition, factors for variation (which would occur when large number of parts are assembled and connected together) are reduced so that quality can be stabilized.

According to a further feature of the invention, for example, as defined in the claim 16, the communication through-hole is formed in the separation plate at a position closer to the second opening port (connected to the fuel pressurizing chamber). As a result, the fuel flow from the through-hole may hardly and directly affect to the pulsation damper (which is located at a center of the fuel gallery). In addition, even when the fuel inlet port is formed at a position closer to the second opening port (connected to the fuel pressurizing chamber), the fuel flow from the through-hole may likewise hardly and directly affect to the fuel inlet port.

According to a further feature of the invention, for example, as defined in the claim 17, the communication through-hole may have a cross section of a rectangular shape. In addition, according to a further feature of the invention, for example, as defined in the claim 18, the communication through-hole may be composed of multiple slit-shaped holes. As in the same manner to the inventions of the claim 4 or 5, the rectangular shape may also include such a shape almost close to the rectangular shape. In other words, an angle of each corner may not be strictly limited to 90 degree, a quadrangle may have a rounded corner, and so on. The slit-shaped holes should not be limited to a rectangular hole but a long hole may be included in the definition of the slit-shaped hole.

According to a further feature of the invention, for example, as defined in the claim 19, the communication through-hole may have an axis inclined at a predetermined angle with respect to a line perpendicular to a surface of the separation plate. The same effects to those of the claim 6 can be obtained.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A high pressure pump, to which a damper device according to the present invention is applied, will be explained with reference to FIG. 1A.

At first, a general structure as well as an operation of the high pressure pump will be explained, except for a connecting tube member 35 (explained below) which is one of characterizing portion for the invention. The high pressure pump 1 according to the first embodiment is mounted on a vehicle, in which fuel is sucked by a low pressure pump (not shown) and supplied to a fuel inlet portion of the high pressure pump, the fuel is pressurized by the high pressure pump, and the pressurized fuel is pumped out to a high pressure fuel line (a common rail) to which multiple fuel injectors are connected. At an upstream side of the fuel inlet portion, a fuel line from the low pressure pump is provided.

Figure 1A:
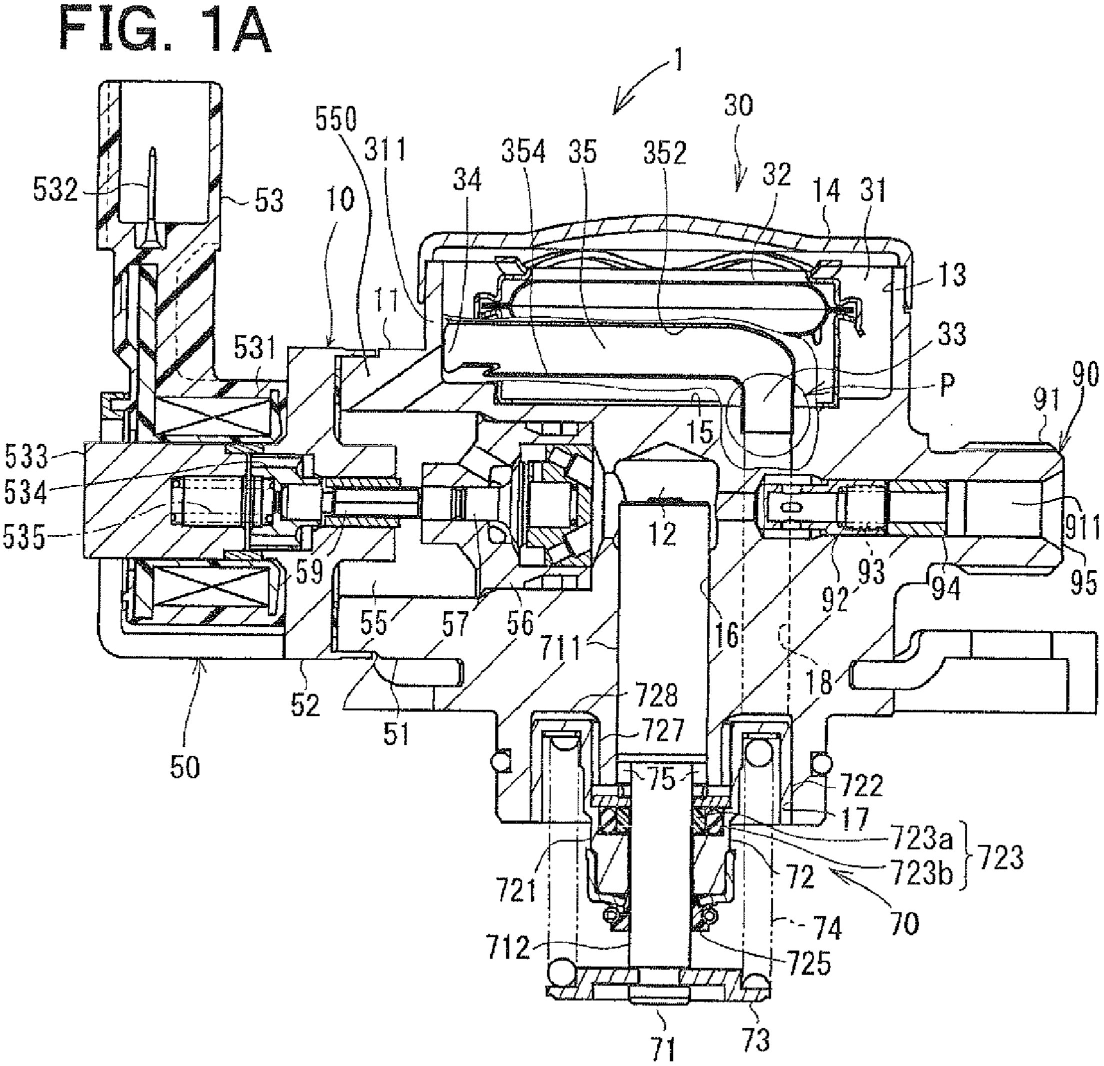
FIG. 1A is a schematic cross sectional view showing a high pressure pump, to which a first to a fifth embodiment of the present invention may be applied.

As shown in FIG. 1A, the high pressure pump 1 has a pump body 10, a fuel supply portion 30, a fuel inlet valve portion 50, a plunger portion 70 and a fuel outlet valve portion 90.

The pump body 10 has a housing 11. The fuel supply portion 30 is formed in a part of the housing 11 (at an upper part of the housing for the high pressure pump shown in FIG. 1A).

The plunger portion 70 is formed in the housing 11 opposite to the fuel supply portion 30 (at a lower part of the housing of the high pressure pump shown in FIG. 1A).

A fuel pressurizing chamber 12 is formed in the housing 11 between the fuel supply portion 30 and the plunger portion 70 for pressurizing the fuel.

The fuel inlet valve portion 50 and the fuel outlet valve portion 90 are respectively formed at a left-hand side and a right-hand side of the housing 11 shown in FIG. 1A, in a direction perpendicular to an arranging direction of the fuel supply portion 30 and the plunger portion 70.

The fuel supply portion 30, the fuel inlet valve portion 50, the plunger portion 70 and the fuel outlet valve portion 90 are further explained in detail.

The fuel supply portion 30 has a fuel gallery 31, which is a space surrounded by a recessed portion 13 of the housing 11 and a cap member 14. A pulsation damper 32 is provided in the fuel gallery 31.

The pulsation damper 32 is formed of a pair of diaphragms, each of which has a damper portion of a convex shape at a center thereof and a flat portion at its periphery, wherein the flat peripheral portions are fixed to each other so that the damper portion is arranged in a vertical direction. Each of the diaphragms has a circular shape and has the damper portion of the convex shape at the center thereof. The flat peripheral portions of the respective diaphragms are attached to each other and welded, so that an inside of the pulsation damper 32 is sealed from the outside air-tightly and liquid-tightly.

In FIG. 1A, the pulsation damper 32 is assembled by a supporting member. However, the invention should not be limited to such a structure (supporting method).

A damping chamber for the pulsation damper 32 is formed between the damper portions, in which gas, such as, helium (He), argon (Ar) or a mixture of these gases, is enclosed at a predetermined pressure. The predetermined pressure may be decided in consideration of various parameters, such as a desired value of a fuel pump on a low pressure side, a desired value of an engine system, material of the diaphragm, a level of the pulsation, and so on. The damper portions may be elastically deformed in accordance with pressure change in the fuel gallery 31, so that volume of the damping chamber is changed to thereby attenuate the pressure pulsation in the fuel gallery 31.

Required durability is set depending on thickness and material of the diaphragm, the pressure of the gas enclosed in the damping chamber, and so on. Likewise, a constant number of spring for the pulsation damper 32 is set depending on the above thickness, the material, the pressure of the gas in the damping chamber, and any other performance requirement. Pulsation frequency of the pulsation damper 32 is decided depending on the constant number of spring. And performance of pulsation attenuation varies depending on the volume of the damping chamber.

Figure 2A:
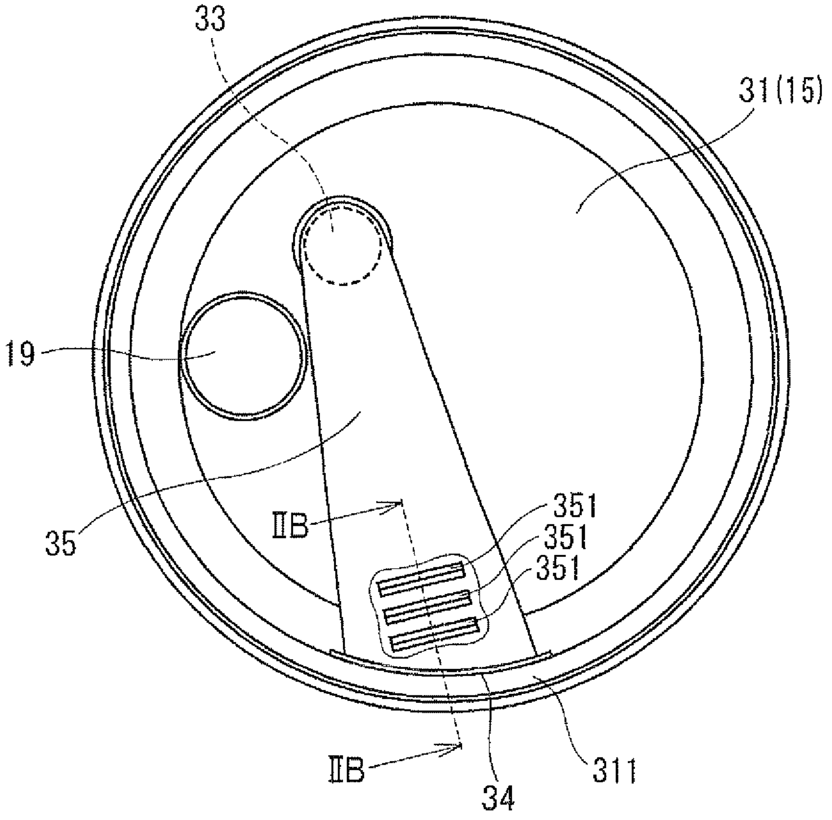
FIG. 2A is a schematic view showing a connecting condition of a connecting tube member according to the first embodiment of the present invention, when viewed from a top side.
Figure 2B:
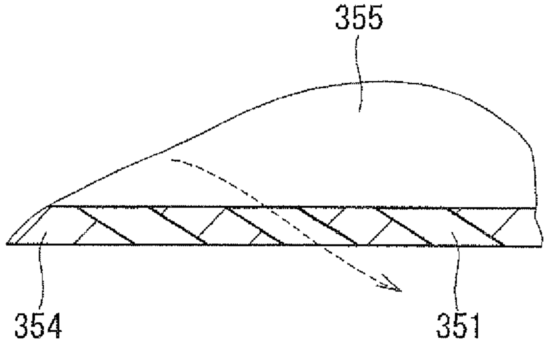
FIG. 2B is a schematic cross sectional view taken along a line IIB-IIB in FIG. 2A.

As shown in FIGS. 2A and 2B, a fuel inlet port 19 is opened to a bottom space 15 of the fuel gallery 31, so that the fuel from the low pressure pump is supplied into a portion of the bottom space 15 in a radial direction.

Next, the plunger portion 70 will be explained. As shown in FIG. 1A, the plunger portion 70 is composed of a large-diameter portion 711 supported by a cylinder 16 formed in the housing 11, and a small-diameter portion 712, an outer diameter of which is smaller than that of the large-diameter portion 711. The large-diameter and small-diameter portions 711 and 712 are integrally formed with each other so that they move in an axial direction in a reciprocating manner as an integral unit.

An oil-seal holder 72 is arranged at a lower end of the cylinder 16. The oil-seal holder 72 has a base member 721 arranged at an outer peripheral portion of the small-diameter portion 712 of a plunger 71, and a press-inserted portion 722 inserted into a recessed portion 17 of the housing 11.

The base member 721 has a seal member 723 of a ring shape inside thereof. The seal member 723 is composed of an inner ring 723*a* (a PTFE seal ring: PTFE=polytetrafluoroethylene) and an outer ring 723*b* (an O-ring). A thickness of oil film (of the fuel) around the small-diameter portion 712 of the plunger 71 is adjusted by the seal member 723, so that leakage of fuel to an engine is suppressed.

An oil-seal 725 is further provided at a forward end of the base member 721, so that a thickness of oil film around the small-diameter portion 712 of the plunger 71 is limited to suppress the leakage of the oil.

The press-inserted portion 722 of the oil-seal holder 72 is formed in a cylindrical shape, extending from an outer periphery of the base member 721 in an upward direction. The cylindrical portion is formed in a reversed U-letter shape in a cross section. The housing 11 has the recessed portion 17 for accommodating the press-inserted portion 722, so that the oil-seal holder 72 is inserted into the housing 11 and the press-inserted portion 722 thereof is pressed against an inner peripheral wall of the recessed portion 17 of the housing 11 in a radial and outward direction.

A spring seat 73 is arranged at the forward end of the plunger 71. The forward end of the plunger 71 is in contact with a tappet (not shown). An outer (and lower) surface of the tappet is in contact with a cam formed on a cam shaft (not shown), so that the tappet is moved in a reciprocating manner in accordance with a cam profile when the cam shaft is rotated. As a result, the plunger 71 is reciprocated in its axial direction.

A plunger spring 74 is attached at its one end (a lower end) to the spring seat 73, while the other end (an upper end) of the plunger spring 74 is inserted into and fixed to an annular space formed by the press-inserted portion 722 of the oil-seal holder 72. As a result, the plunger spring 74 functions as a return spring for the plunger 71 so as to bias the plunger 71 in the direction to the tappet.

According to the above structure, the reciprocal movement of the plunger 71 is realized in accordance with the rotation of the cam shaft. When the plunger 71 is reciprocated, the volume of the fuel pressurizing chamber 12 is changed.

According to the present embodiment, a variable volume chamber 75 is formed around the small-diameter portion 712 of the plunger 71. The variable volume chamber 75 is formed as a space surrounded by the cylinder 16 of the housing 11, a lower end of the large-diameter portion 711 of the plunger 71 (a stepped portion between the large-diameter and the small-diameter portions 711 and 712), an outer peripheral surface of the small-diameter portion 712, and the seal member 723 of the oil-seal holder 72. As already explained above, the seal member 723 suppresses the leakage of the fuel. The seal member 723 liquid-tightly seals the variable volume chamber 75 to prevent the leakage of the fuel into the engine.

The variable volume chamber 75 is communicated to an opening port 33 (a first opening port) opening to the fuel gallery 31 through an annular passage way 727 formed between an inner peripheral wall of the press-inserted portion 722 and the recessed portion 17, a circular passage way 728 formed at the bottom of the recessed portion 17 (the upper side of the recessed portion 17), and a fuel passage way 18 (indicated by a dotted line in FIG. 1A) formed in the housing 11.

Now, the fuel inlet valve portion 50 will be explained. As shown in FIG. 1A, the fuel inlet valve portion 50 has a cylindrical portion 51 formed in the housing 11, a cover member 52 for closing an open end of the cylindrical portion 51, a connector 53 and so on.

The cylindrical portion 51 is formed in a cylindrical shape, an inside of which is formed as a fuel passage way 55. A seat body 56 is arranged in the fuel passage way 55. A suction valve 57 is provided in the seat body 56. The fuel passage way 55 is communicated with the fuel gallery 31 through another opening port (a second opening port) 34 formed in the housing 11.

A needle 59 is in contact with the suction valve 57. The needle 59 penetrates into the cover member 52 and extends to an inside of the connector 53. The connector 53 has a coil 531 and a terminal 532 for supplying electrical power to the coil 531. Inside of the coil 531, there are provided with a fixed core 533, a movable core 534, and a spring 535 provided between the fixed core 533 and the movable core 534. The needle 59 is connected to the movable core 534, so that the needle 59 and the movable core 534 move together as one unit.

According to the above structure, when the electric power is supplied to the coil 531 via the terminal 532 of the connector 53, magnetic flux is generated at the coil 531 so that the movable core 534 is attracted toward the fixed core 533 (in the left-hand direction in FIG. 1A). The movable core 534 is thereby moved to the fixed core 533 and the needle 59 is moved in a direction away from the fuel pressurizing chamber 12. In this situation, the movement of the suction valve 57 is not restricted by the needle 59. As a result, the suction valve 57 becomes able to be seated on the seat body 56. When the suction valve 57 is seated on the seat body 56, communication between the fuel passage way 55 and the fuel pressurizing chamber 12 is shut off.

When no electric power is supplied to the coil 531 via the terminal 532 of the connector 53, no electromagnetic attracting force is generated. The movable core 534 is moved toward the fuel pressurizing chamber 12 by the spring 535. The needle 59 is thereby moved in a direction closer to the fuel pressurizing chamber 12 (in the right-hand direction in FIG. 1A). As a result, the movement of the suction valve 57 is restricted by the needle 59 so that the suction valve 57 is held at a position on a side to the fuel pressurizing chamber 12. In this situation, the suction valve 57 is separated from the seat body 56 in order to communicate the fuel passageway 55 and the fuel pressurizing chamber 12 with each other.

The fuel outlet valve portion 90 will be next explained. As shown in FIG. 1A, the fuel outlet valve portion 90 has a cylindrical accommodating portion 91 formed in the housing 11. A fuel outlet valve 92, a spring 93 and a stopper member 94 are accommodated in an accommodating chamber 911 formed in the cylindrical accommodating portion 91. An open end of the cylindrical accommodating portion 91 is formed as a fuel outlet port 95. A valve seat is formed at a bottom of the accommodating chamber 911, which is at an opposite side of the fuel outlet port 95.

The fuel outlet valve 92 is seated on the valve seat by a biasing force of the spring 93 and fuel pressure from the high pressure fuel line (the common rail; not shown). The fuel outlet valve 92 stops fuel discharge so long as the fuel pressure in the fuel pressurizing chamber 12 is lower than the above biasing force and the fuel pressure from the common rail. The fuel outlet valve 92 is moved toward the fuel outlet port 95, when the fuel pressure in the fuel pressurizing chamber 12 is increased to become larger than the above biasing force and the fuel pressure from the common rail. As a result, the fuel flowing into the accommodating chamber 911 is discharged from the fuel outlet port 95.

(Operation)

An operation of the high pressure pump 1 will be explained. The high pressure pump shown in FIG. 1A is operated by repeating a suction stroke, a fuel amount adjusting stroke, and a pressurizing stroke.

In the suction stroke, fuel is sucked from the fuel gallery 31 into the fuel pressurizing chamber 12. During the suction stroke, the plunger 71 is moved down from the top dead center toward the bottom dead center, and the suction valve 57 is in the opened condition.

In the fuel amount adjusting stroke, a part of the fuel is returned from the fuel pressurizing chamber 12 into the fuel gallery 31. During the fuel amount adjusting stroke, the plunger 71 is moved up from the bottom dead center toward the top dead center, and the suction valve 57 is maintained in the opened condition. Accordingly, the fuel returned from the fuel pressurizing chamber 12 into the fuel gallery 31 during the fuel amount adjusting stroke is low pressure fuel. A method of adjusting the fuel amount according to the present embodiment is called as a pre-stroke fuel amount adjustment.

In the pressurizing stroke, the fuel is pumped out from the fuel pressurizing chamber 12 through the fuel outlet valve portion 90.

During the pressurizing stroke, the plunger 71 is further moved up from the bottom dead center toward the top dead center, and the suction valve 57 is maintained in the closed condition.

A function of the variable volume chamber 75 will be explained. During the suction stroke, the volume of the fuel pressurizing chamber 12 is increased because of the downward movement of the plunger 71. On the other hand, the volume of the variable volume chamber 75 is decreased. As a result, the fuel stored in the variable volume chamber 75 is supplied to the (second) opening port 34 through a connecting tube member 35.

During the above fuel amount adjusting stroke, the volume of the fuel pressurizing chamber 12 is decreased because of the upward movement of the plunger 71. On the other hand, the volume of the variable volume chamber 75 is increased. A part of the fuel (excessive fuel), which is returned from the fuel pressurizing chamber 12 into the fuel gallery 31, is supplied into the variable volume chamber 75 through the connecting tube member 35.

A volume change of the variable volume chamber 75 is caused by the large-diameter 711 of the plunger 71, as in the same manner to the volume change of the fuel pressurizing chamber 12. Namely, a ratio of the volume change for the fuel pressurizing chamber 12 with respect to the volume change for the variable volume chamber 75 is constant, and the volume change for the variable volume chamber 75 is generated in the same phase to that for the fuel pressurizing chamber 12.

In the pressurizing stroke, since the suction valve 57 is maintained in the closed condition, the fuel may not be returned from the fuel pressurizing chamber 12 to the connecting tube member 35.

Advantages of the high pressure pump 1 according to the present embodiment will be explained.

As already explained above, the volume changes occur in the same phase between the fuel pressurizing chamber 12 and the variable volume chamber 75. Hereinafter, the explanation will be further made for a case in which the volume change for the fuel pressurizing chamber 12 is “100”, while the volume change for the variable volume chamber 75 is “60”.

In the fuel amount adjusting stroke, pressure pulsation of the fuel may be a problem. In the case that volume decrease for the fuel pressurizing chamber 12 is “100”, the pressure pulsation of the fuel corresponding to this “100” may occur in the fuel gallery 31. When the pressure pulsation is propagated from the fuel inlet port 19 to outside fuel lines or to pipe supporting members, abnormal noise may be generated. In addition, when resonance may be generated, the pipe supporting members may be damaged.

According to the present embodiment, the volume of the variable volume chamber 75 is increased in accordance with the decrease of the volume for the fuel pressurizing chamber 12. And the ratio of the volume change is “100/60”. Accordingly, when the volume decrease of the fuel pressurizing chamber 12 is “100”, the volume increase of the variable volume chamber 75 is “60”. In other words, “60” of the fuel decreased amount “100”, which is returned into the fuel gallery 31, is covered (absorbed) by the fuel increased amount in the variable volume chamber 75. The remaining “40” of the fuel decreased amount “100” in the fuel pressurizing chamber 12 should be covered by any other portions than the variable volume chamber 75. Otherwise, a larger pressure pulsation can not be avoided.

According to the present embodiment, the connecting tube member 35 is provided. Therefore, the fuel increase can be more directly absorbed by the variable volume chamber 75. Since the variable volume chamber 75 shows the maximum effect of absorbing the fuel increase, the pressure pulsation to be generated in the fuel gallery 31 is suppressed to such a pulsation, which would be caused by the fuel increase of "40".

In addition, as explained above, since the volume change (the volume decrease) in the fuel pressurizing chamber 12 takes place in the same phase with the volume change (the volume increase) in the variable volume chamber 75, the above effect of the variable volume chamber 75 can be obtained irrespectively of rotational speed of the engine.

The small-diameter portion 712 is formed at the plunger 71 in order to form the variable volume chamber 75. When the small-diameter portion 712 is sealed by the seal member 723 and the oil-seal 725, a more effective sealing result can be obtained when compared with the seal at the large-diameter portion, because a circumferential length at the small-diameter portion is smaller than that at the large-diameter portion.

Since the seal portion is made smaller in size, the oil-seal holder 72 can be likewise made smaller in size. The plunger spring 74 can be also made smaller in size. As a result, the size of the high pressure pump can be made smaller.

When an outer diameter of the large-diameter portion 711 is made further larger, while the outer diameter of the small-diameter portion 712 is maintained as it is, a discharge amount can be increased. In such a case, it is necessary to change the design only for the large-diameter portion 711 and the cylinder 16. In other words, the design change for increasing the discharge amount can be easily done.

(The Connecting Tube Member)

As shown in FIG. 1A, the first and second opening ports 33 and 34 are communicated with each other by the connecting tube member 35 provided in the fuel gallery 31.

Figure 3A:
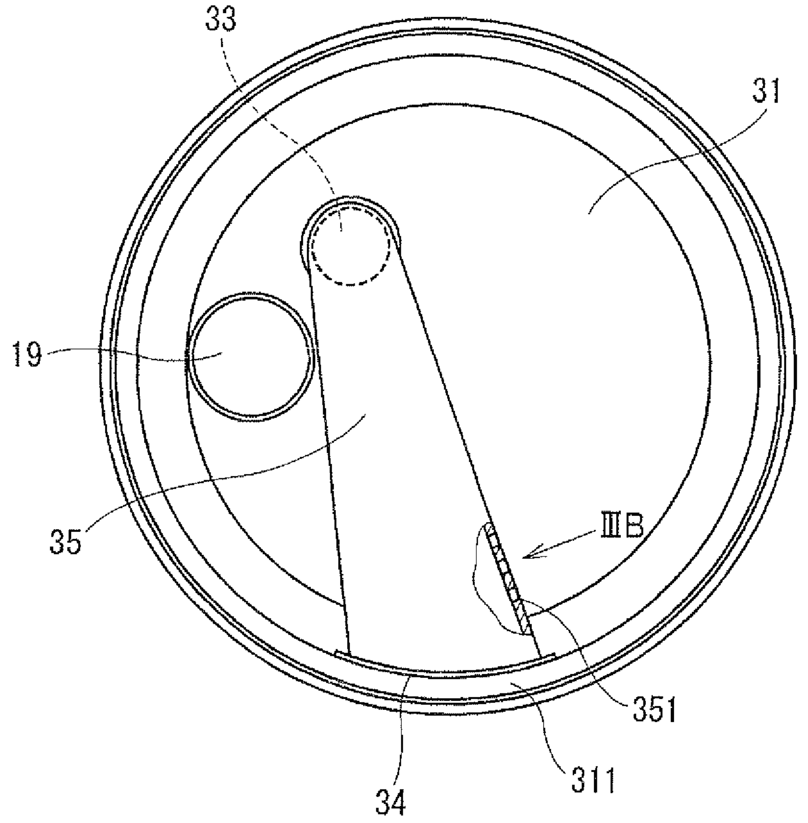
FIG. 3A is a schematic view showing a connecting condition of a connecting tube member according to the second embodiment of the present invention, when viewed from a top side.
Figure 3B:
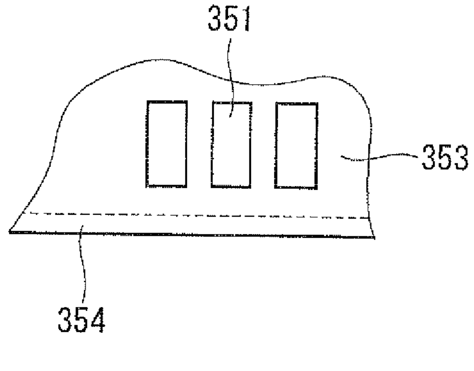
FIG. 3B is a schematic enlarged view when viewed in a direction of an arrow IIIB in FIG. 3A.

In each of FIGS. 2A, 3A, 4A, 5 and 6, the connecting tube member 35 according to the first to fifth embodiments of the present invention is schematically shown when it is viewed from the top, namely in a direction from an upper side toward a lower side in FIG. 1A. In FIG. 1A, a numeral 352 designates an upper wall of the tube member 35, while a numeral 354 designates a lower wall (a bottom wall) of the tube member 35. In FIG. 3B, for example, a numeral 353 designates a side wall of the connecting tube member 35. In each of FIGS. 2A, 3A, 4A, 5 and 6, a part of the upper wall 352 is removed so that a corresponding part of the lower wall 354 or a corresponding part of the side wall 353 can be better seen. In FIG. 3A, a cross section of the side wall 353, which is located at an opposite side to the fuel inlet port 19 (that is, the side more remote from the fuel inlet port 19) is shown.

In the above explanation, although the upper wall, the lower wall and the side wall are used, the invention should not be limited to the tube member 35 having a rectangular cross section. Any tube member having a cross section of a circular shape, an elliptical shape, an oval shape and so on, may be used.

The connecting tube member 35 may be made of elastic material, resin, metal, and so on. When the connecting tube member 35 is made of the elastic member, since the elastic force thereof may have a function for suppressing pulsation of fuel flowing through the connecting tube member 35, the pulsation in the fuel gallery 31 can be more effectively suppressed. In the case that the connecting tube member 35 is made of resin, since it may be possible to manufacture parts of the tube member 35 (having communication through-holes 351) by a molding die at one molding process, the connecting tube member 35 can be made in a simpler manner and at a lower cost.

As shown in FIG. 1A, the second opening port 34 is opened at a side wall 311 of the fuel gallery 31. An inclined fuel passage 550 is formed in the housing 11, so that the second opening port 34 is communicated with the fuel passage way 55 through the inclined fuel passage 550. Therefore, the fuel passage way 55 is communicated with the connecting tube member 35. The fuel passage 550 is not necessarily formed as a straight passage. It may be formed as a curved passage, such as a hooked-shaped fuel passage.

As above the first and second opening ports 33 and 34 are communicated with each other via the connecting tube member 35. Multiple communication through-holes 351 are formed either at the lower wall (the bottom wall) 354 or at the side wall 353, so that the inside of the connecting tube member 35 is communicated to the fuel gallery 31.

Figure 1B:
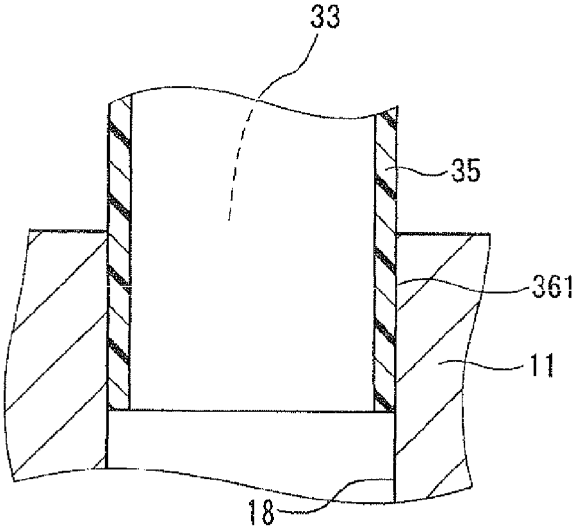
FIG. 1B is an enlarged schematic view showing a portion P shown in FIG. 1A.

FIG. 1B is an enlarged schematic cross sectional view showing a portion P shown in FIG. 1A. More exactly, FIG. 1B schematically shows one end portion of the connecting tube member 35, which is inserted into the first opening port 33 of the housing 11. As shown in FIG. 1B, an outer end 361 of the connecting tube member 35 is inserted into the passage way 18 formed in the housing 11. Alternative structures for fixing the end portion of the connecting tube member 35 to the first opening port 33 (that is, to the passage way 18) will be explained below with reference to the seventh to ninth embodiments.

In FIGS. 2A and 2B, the communication through-holes 351 are formed at the lower wall 354 of the connecting tube member 35, at a position closer to the second opening port 34. As shown in FIGS. 2A and 2B, the communication through-holes 351 are composed of three slit-shaped through-holes, wherein each of the through-holes 351 has an axis inclined at a predetermined angle with respect to a line perpendicular to the surface of the lower wall 354. FIG. 25 is a schematic cross sectional view taken along a line IIB-IIB in FIG. 2A. For example, the axis of the through-hole 351 is inclined by 60 degrees with respect to the line perpendicular to the surface of the lower wall 354. In other words, the fuel flows out from the inside of the connecting tube member 35 into the fuel gallery 31 as indicated by an arrow of a dotted line, which corresponds to an angle of 150 degrees with respect to a fuel flow direction from the second opening port 34 toward the first opening port 33. Therefore, when compared with a case, in which the communication through-hole is provided at a right angle (90 degrees) to the surface of the lower wall, the fuel is less likely to flow out in the present embodiment (FIG. 2B) from the connecting tube member 35 into the fuel gallery 31.

Since the first and second opening ports 33 and 34 are communicated with each other by the connecting tube member 35, the decreased amount of the fuel caused by the volume change of the fuel pressurizing chamber 12 during the fuel amount adjusting stroke is directly guided to the variable volume chamber 75, without being directly supplied into the fuel gallery 31. As a result, pressure pulsation in the fuel gallery 31 can be suppressed to a smaller value. In addition, since the communication through-holes 351 are formed at the connecting tube member 35, the fuel (an amount of which corresponds to a difference volume between the volume change in the fuel pressurizing chamber 12 and the volume change in the variable volume chamber 75) may gradually flow into the fuel gallery 31 through the communication through-holes 351 during the fuel amount adjusting stroke. Therefore, the connecting tube member 35 is in no danger of being broken due to expansion thereof. On the contrary, since the fuel can be supplied into the fuel passage way 55 and/or the fuel gallery 31 during the suction stroke from the variable volume chamber 75, it may be possible to avoid a case in which the suction amount of the fuel may become smaller than required.

Furthermore, the communication through-holes 351 are formed at the lower wall 354 closer to the second opening port 34. In other words, the communication through-holes 351 are directed in a direction other than a direct direction, in which the through-holes 351 face to the fuel inlet port 19. As a result, the fuel from the connecting tube member 35 through the communication through-holes 351 is less likely to flow toward the fuel inlet port 19. In addition, the fuel from the connecting tube member 35 through the communication through-holes 351 may hardly have an impact to the pulsation damper 32, which is arranged above the connecting tube member 35.

Namely, since the fuel flows from the second opening port 34 into the fuel gallery 31 through the inside 355 of the connecting tube member 35, the pressure pulsation may be propagated by getting around more than the conventional pump. During the propagation along a longer fuel passage, the fuel flow loses its energy to thereby suppress the pressure pulsation.

When compared the present embodiment with the convention case, in which the fuel is directly discharged into the fuel gallery 31 from the fuel pressurizing chamber 12, the behavior of the pulsation damper 32 may not be harmed by the fuel flow into the fuel gallery to thereby prevent the generation of the pressure pulsation. It is also possible to avoid such a situation, in which the discharged fuel may swiftly flow into the fuel line through the fuel inlet port 19, the pressure pulsation may be propagated through the fuel line and thereby the pressure pulsation may adversely affect the pipe supporting members, the abnormal sounds may be generated due to the vibration of the fuel line, the pipe supporting members may be damaged, and so on.

According to the present embodiment, the communication through-holes 351 are composed of multiple slit-shaped holes, which are formed at the wall of the connecting tube member 35. In addition, the through-hole is formed at the wall in such a way that it has the axis inclined at the predetermined angle with respect to the line perpendicular to the surface of the wall. Therefore, it may be possible to control (or adjust) fluid resistance for the fuel flow from the inside 355 of the connecting tube member 35 into the fuel gallery 31.

Second Embodiment

According to a second embodiment shown in FIGS. 3A and 3B, three slit-shaped through-holes 351 are formed at the side wall 353 of the connecting tube member 35 at such a portion closer to the second opening port 34. Each of the through-holes 351 has an axis at a right angle (90 degrees) with respect to the surface of the side wall 353. FIG. 3B is a schematic enlarged view when the connecting tube member 35 is viewed in a direction of an arrow IIIB in FIG. 3A.

According to the second embodiment, the communication through-holes 351 are likewise formed at the side wall 353 closer to the second opening port 34. In other words, the communication through-holes 351 are directed in the direction other than the direct direction, in which the through-holes 351 face to the fuel inlet port 19. As a result, the fuel from the connecting tube member 35 through the communication through-holes 351 is less likely to flow toward the fuel inlet port 19 or less likely to give a direct impact to the fuel inlet port 19. In addition, the fuel from the connecting tube member 35 through the communication through-holes 351 may hardly have an impact to the pulsation damper 32, which is arranged above the connecting tube member 35.

As above, the second embodiment is different from the first embodiment in that the through-holes 351 are formed at the side wall of the connecting tube member 35 and the angle thereof is 90 degrees to the surface of the side wall 353. Therefore, the second embodiment may obtain the same advantages to the first embodiment.

Third Embodiment

Figure 4A:
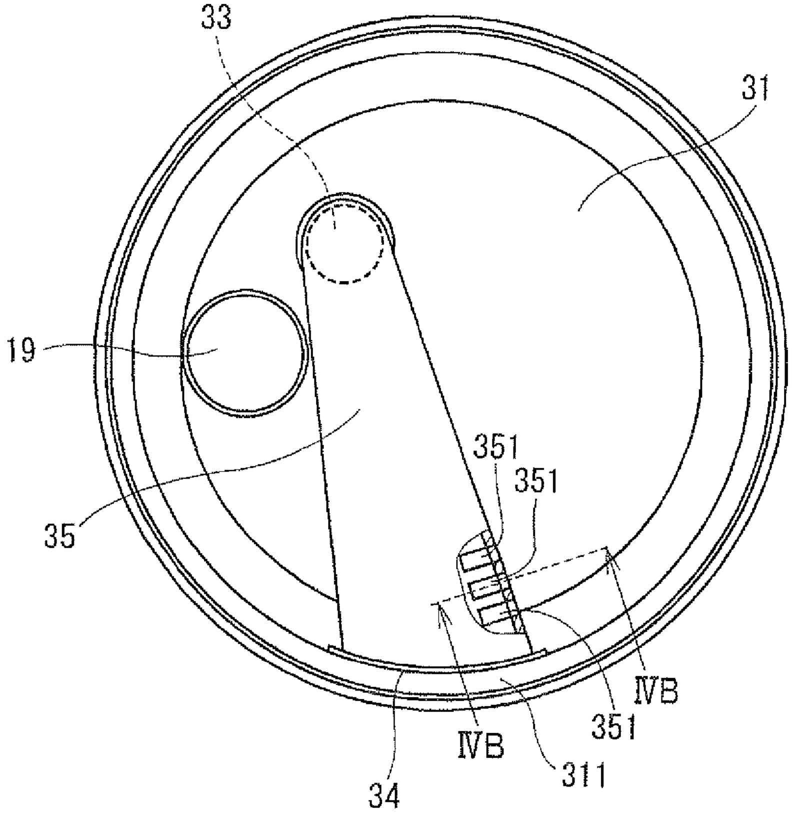
FIG. 4A is a schematic view showing a connecting condition of a connecting tube member according to the third embodiment of the present invention, when viewed from a top side.
Figure 4B:
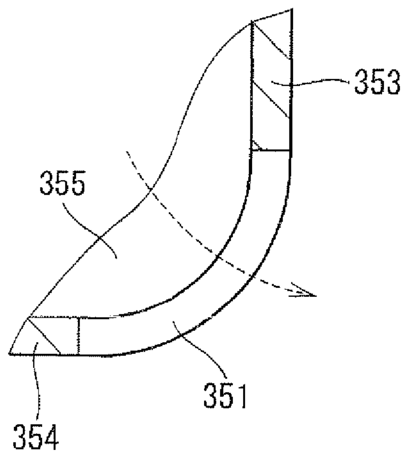
FIG. 4B is a schematic cross sectional view taken along a line IVB-IVB in FIG. 4A.

According to a third embodiment shown in FIGS. 4A and 4B, three slit-shaped through-holes 351 are formed at a corner between the side wall 353 and the lower wall 354 of the connecting tube member 35 and at such a portion closer to the second opening port 34. FIG. 4B is a schematic cross sectional view taken along a line IVB-IVB in FIG. 4A, wherein a dotted line shows a direction of the fuel discharged from the inside 355 of the connecting tube member 35 into the fuel gallery 31.

According to the above third embodiment, the through-holes 351 are formed at the corner between the side wall 353 and the lower wall 354 of the connecting tube member 35 and at the portion close to the second opening port 34. Therefore, the communication through-holes 351 are directed in the direction other than the direct direction, in which the through-holes 351 face to the fuel inlet port 19. As a result, the fuel from the connecting tube member 35 through the communication through-holes 351 is less likely to give a direct impact to the fuel inlet port 19. Furthermore, the fuel from the connecting tube member 35 through the communication through-holes 351 may hardly have the impact to the pulsation damper 32, which is arranged above the connecting tube member 35. As above, the third embodiment may obtain the same or similar advantages to the first and/or second embodiments.

Fourth Embodiment

Figure 5:
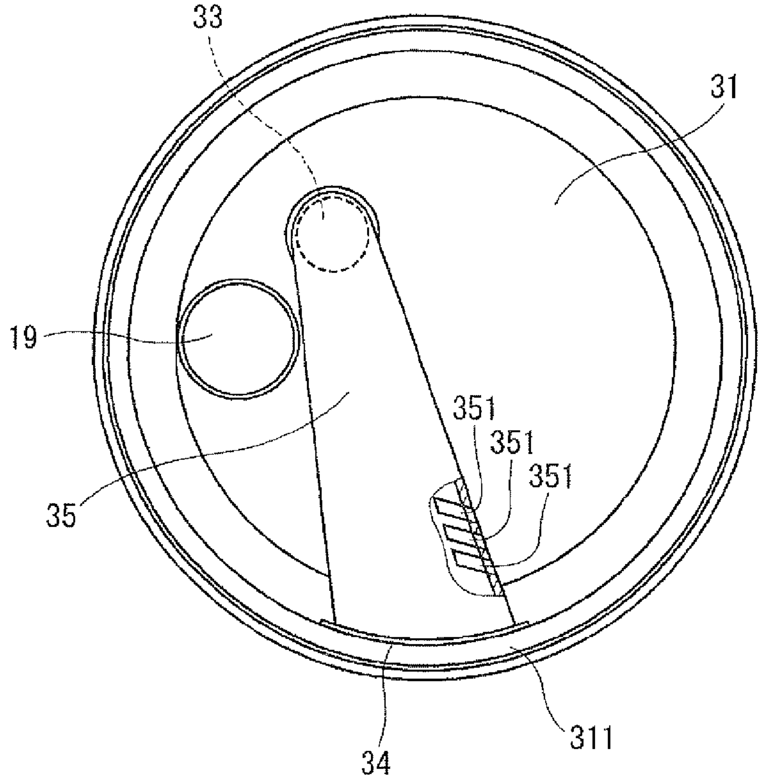
FIG. 5 is a schematic view showing a connecting condition of a connecting tube member according to the fourth embodiment of the present invention, when viewed from a top side.

According to a fourth embodiment shown in FIG. 5, three slit-shaped through-holes 351 are formed at a corner between the side wall 353 and the lower wall 354 of the connecting tube member 35 and at such a portion closer to the second opening port 34.

As shown in FIG. 5, each of the through-holes 351 is formed at the side wall and the lower wall in such a way that it has the axis inclined at a predetermined angle with respect to a line perpendicular to the surface of the side wall. For example, the axis of the through-hole 351 is inclined toward the first opening port 33 by 30 degrees from the line perpendicular to the surface of the side wall 353.

According to the fourth embodiment, the position of the through-holes 351 is the same to that of the third embodiment. The inclination of the through-holes 351, which is inclined from the line perpendicular to the surface of the wall toward the first opening port, is also the same to that of the first embodiment. As a result, the fourth embodiment may obtain the same or similar advantages to the first to the third embodiments.

Fifth Embodiment

Figure 6:
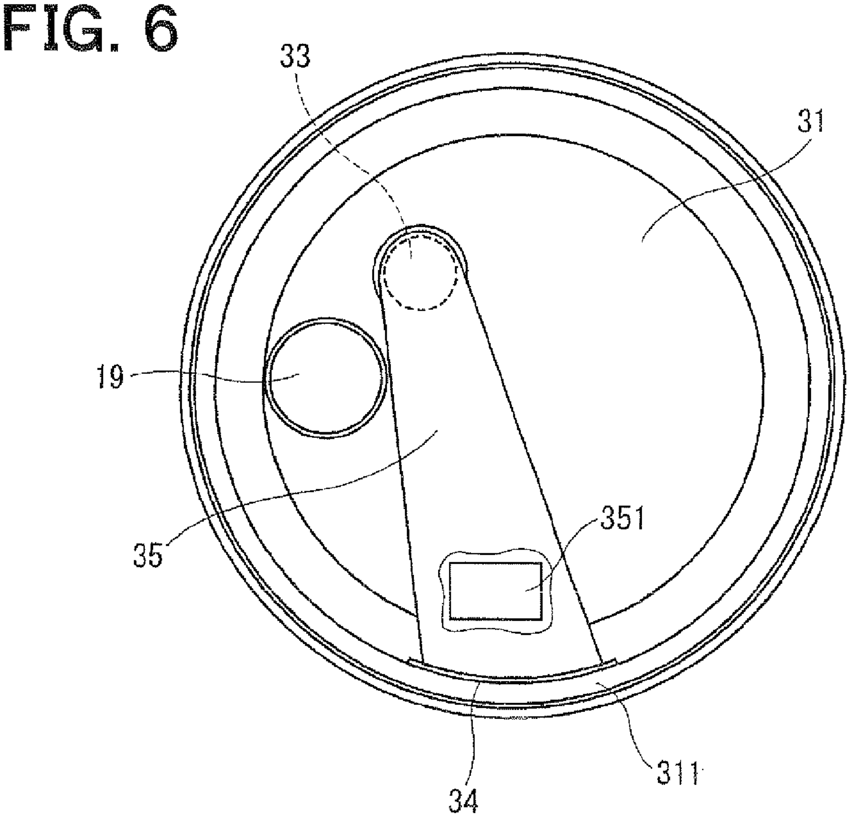
FIG. 6 is a schematic view showing a connecting condition of a connecting tube member according to the fifth embodiment of the present invention, when viewed from a top side.

According to a fifth embodiment shown in FIG. 6, a rectangular shaped through-hole 351 is formed at the lower wall 354 of the connecting tube member 35 and at such a portion closer to the second opening port 34.

Although the fifth embodiment is different from the first embodiment in the number and an area of the through-hole 351, the fifth embodiment is almost the same to the first embodiment in the other aspects. Therefore, the fifth embodiment may obtain the same or similar advantages to the first embodiment. Since there is one through-hole 351 formed at the connecting tube member 35, it is easier to manufacture the same.

The area of the through-hole 351 should have such a value, according to which an amount of fuel (which corresponds to a volume difference between the fuel pressurizing chamber 12 and the variable volume chamber 75) can stably flow through the through-hole 351 within a predetermined time. When the area of the through-hole 351 is larger than necessary, the fuel discharged from the connecting tube member 35 into the fuel gallery 31 may affect to the fuel inlet portion 19 and the pulsation damper 32. Accordingly, it is desirable to set the area of the through-hole 351 at a suitable value, based on flow analysis and/or through experiments.

Sixth Embodiment

Figure 7:
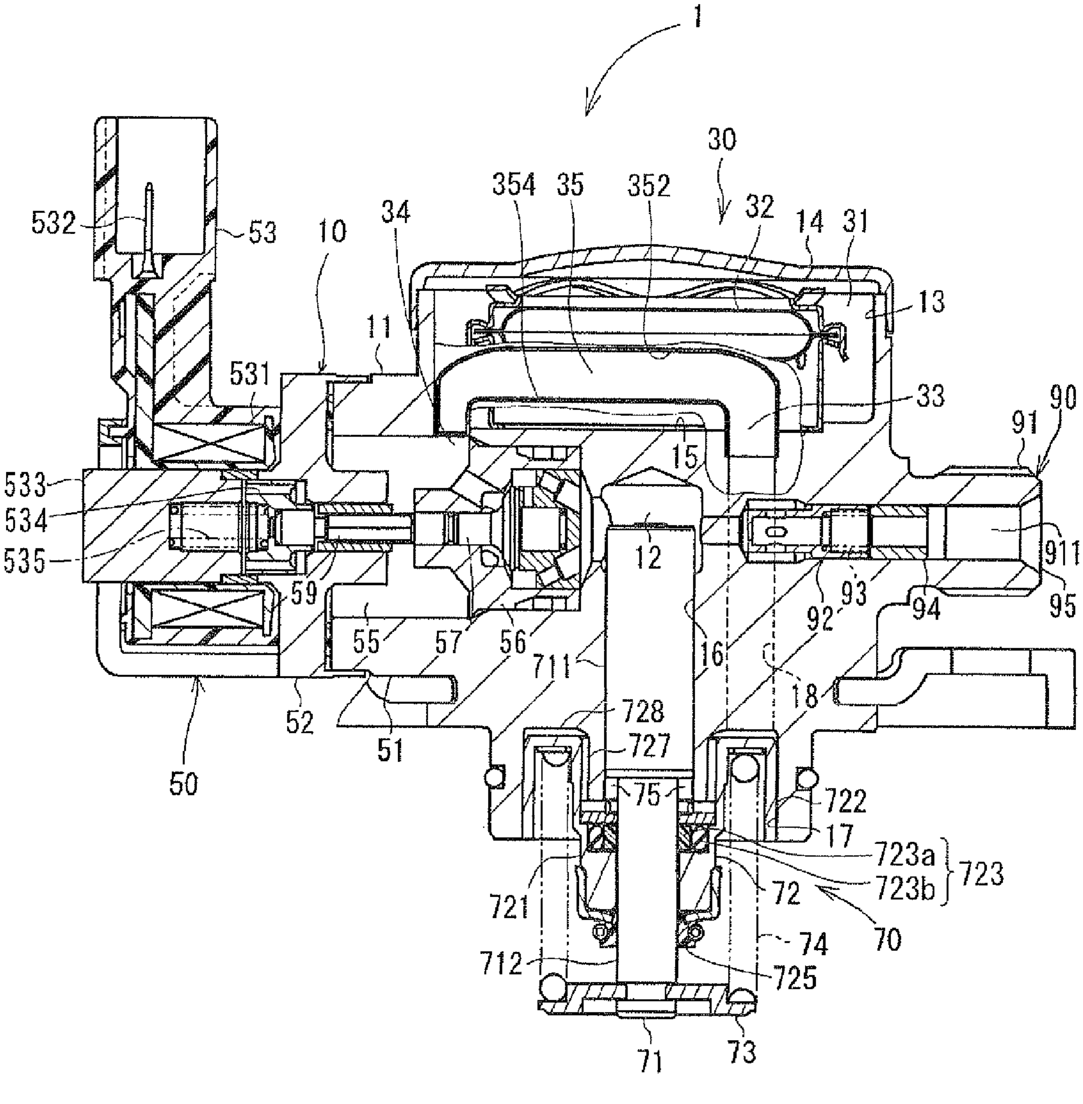
FIG. 7 is a schematic cross sectional view showing a high pressure pump according to a sixth embodiment of the present invention.

FIG. 7 is a cross sectional view showing a high pressure pump 1 according to a sixth embodiment of the present invention. FIG. 7 corresponds to FIG. 1A, wherein the high pressure pump shown in FIG. 7 is different from that of FIG. 1A in a structure of the connecting tube member 35. Namely, the connecting tube member 35 has a curved portion in a fuel flow direction. More exactly, one end of the connecting tube member 35 on the side closer to the second opening port 34 is bent at 90 degrees in a downward direction. The second opening port 34 is opened at the bottom of the fuel gallery 31 in a vertical direction. The end of the connecting tube member 35 is partly inserted into the second opening port 34, so that the connecting tube member 35 is directly communicated to the fuel passage way 55. The other portions of the sixth embodiment are substantially the same to the above embodiments.

According to the sixth embodiment, the communication through-holes 351 are formed in the same or similar manner to those in any one of the first to fifth embodiments, although not shown in FIG. 7. Namely, the communication through-holes 351 are directed in the direction other than the direct direction, in which the through-holes 351 face to the fuel inlet port 19. In addition, the communication through-holes 351 may preferably be formed at the lower wall and/or side wall other than an outer-side wall of the curved portion of the connecting tube member 35.

This is because the fuel pressure at an outer side of the curved portion is higher than that at other portions of the connecting tube member 35 when the fuel flows through the inside 355 of the connecting tube member 35, and thereby the fuel amount discharged from the connecting tube member 35 into the fuel gallery 31 may be increased. Therefore, when the communication through-holes 351 are formed at the side wall and/or an inner wall at the curved portion, the fuel from the first opening port 33 or the second opening port 34 may not directly flow out from the connecting tube member 35 into the fuel gallery 31, and the generation of the pressure pulsation may be suppressed.

Seventh to Ninth Embodiments

Figure 8:
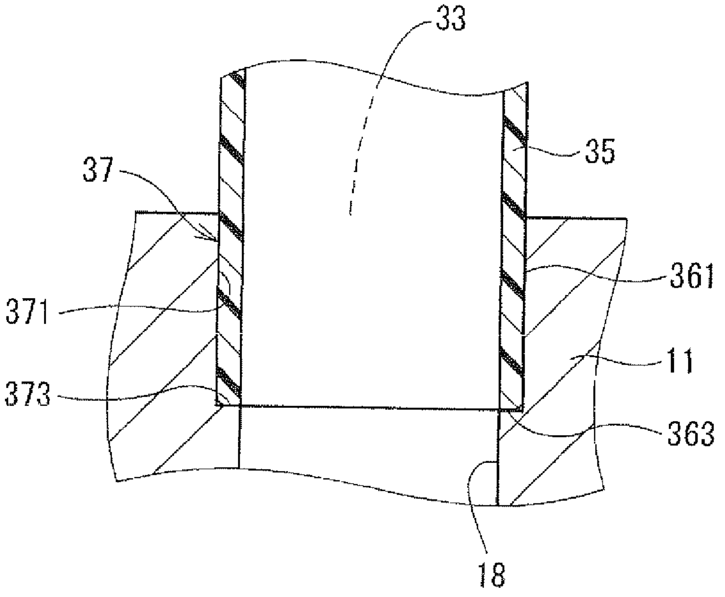
FIG. 8 is an enlarged schematic cross sectional view showing a portion, which corresponds to the portion P shown in FIG. 1A, according to a seventh embodiment of the present invention.
Figure 9:
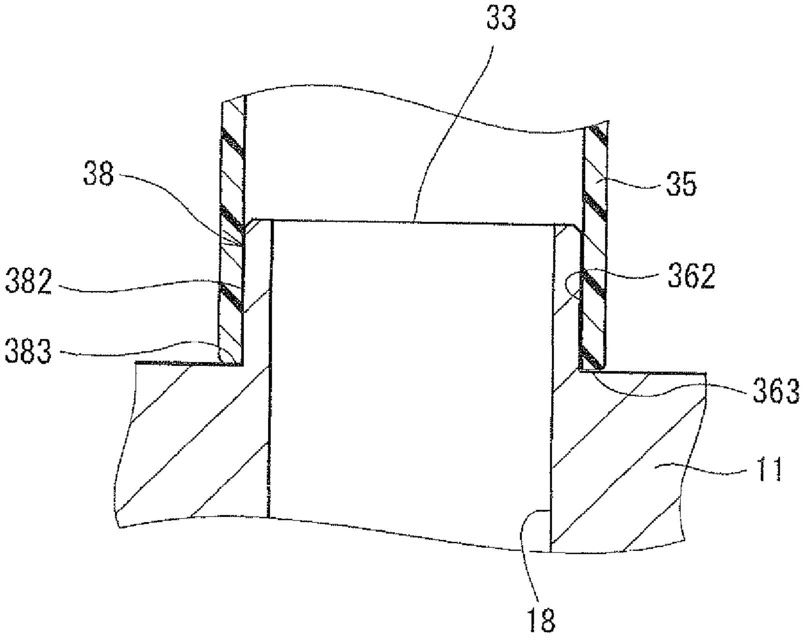
FIG. 9 is an enlarged schematic cross sectional view showing a portion, which corresponds to the portion P shown in FIG. 1A, according to an eighth embodiment of the present invention.
Figure 10:
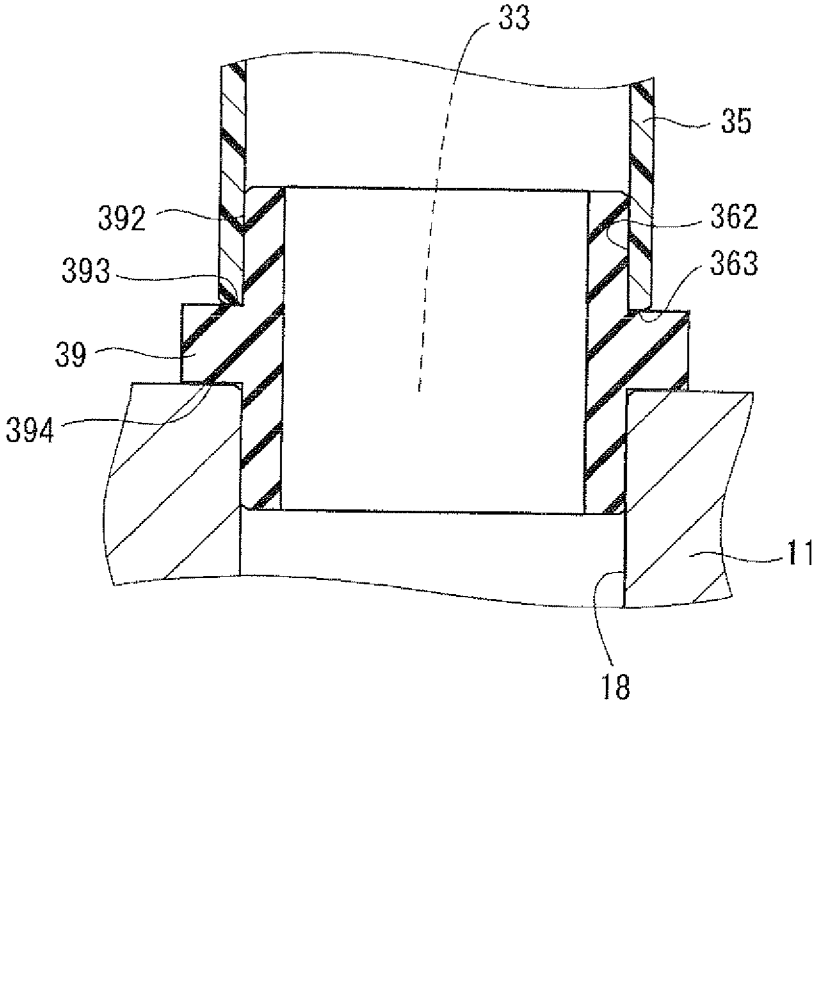
FIG. 10 is an enlarged schematic cross sectional view showing a portion, which corresponds to the portion P shown in FIG. 1A, according to a ninth embodiment of the present invention.

Each of FIGS. 8 to 10 is an enlarged schematic cross sectional view showing a portion, which corresponds to the portion P shown in FIG. 1A, according to a seventh to ninth embodiment of the present invention. In FIGS. 8 to 10, the end of the connecting tube member 35 is connected to the first opening port 33 formed in the housing 11. In the drawings, it is supposed that each of the connecting tube member 35 and the passage way 18 has a circular cross section. However, the invention should not be so limited.

In the seventh embodiment shown in FIG. 8, a large-diameter recessed portion 37 is formed at the first opening port 33, into which the end (the first end) of the connecting tube member 35 is inserted.

More exactly, the large-diameter recessed portion 37 has an inner wall 371 and a stepped portion 373 at a bottom of the recessed portion 37. The outer end 361 of the connecting tube member 35 is inserted into the recessed portion 37 until a forward end 363 of the connecting tube member 35 is brought into contact with the stepped portion 373. Compared with the first embodiment (FIG. 1B), which does not have a large-diameter recessed portion, an insertion depth of the first end of the connecting tube member 35 is set to a constant value and therefore an arrangement of the connecting tube member 35 in the pump becomes more stable.

When the connecting tube member 35 is made of the elastic material, a diameter of the inner wall 371 may be made smaller than a diameter of the outer end 361 of the connecting tube member 35. Then, the outer end 361 of the connecting tube member 35 is compressed when inserted into the recessed portion 37, so that the connecting tube member 35 is hardly dismantled from the recessed portion 37.

In the eighth embodiment shown in FIG. 9, a pipe-shaped projection 38 is formed at the first opening port 33, and the first end of the connecting tube member 35 is fixed to the projection 38.

More exactly, the pipe-shaped projection 38 has an outer wall 382 and a stepped portion 383 formed at a bottom around the projection 38. The projection 38 is inserted into an inner end 362 of the connecting tube member 35 until the forward end 363 of the connecting tube member 35 is brought into contact with the stepped portion 383. As a result, an insertion depth of the first end of the connecting tube member 35 is set to a constant value and therefore an arrangement of the connecting tube member 35 in the pump becomes more stable.

When the connecting tube member 35 is made of the elastic material, a diameter of the outer wall 382 may be made larger than a diameter of the inner end 362 of the connecting tube member 35. Then, the inner end 362 of the connecting tube member 35 is expanded when fixed to the projection 38, so that the connecting tube member 35 is hardly dismantled from the projection 38.

In the ninth embodiment shown in FIG. 10, a pipe member 39 is provided at the first opening port 33 and the first end of the connecting tube member 35 is fixed to the pipe member 39.

More exactly, the pipe member 39 has a flanged portion at an intermediate portion and a lower end of the pipe member 39 is inserted into the passage way 18. A flanged surface 394 of the flanged portion is brought into contact with the surface of the housing 11 at the first opening port 33, so that the pipe member 39 is firmly positioned to the housing 11. An outer wall 392 and a stepped portion 393 are formed at an upper end of the pipe member 39.

The upper end of the pipe member 39 is inserted into the inner end 362 of the connecting tube member 35 until the forward end 363 of the connecting tube member 35 is brought into contact with the stepped portion 393. As a result, an insertion depth of the first end of the connecting tube member 35 is set to a constant value and therefore an arrangement of the connecting tube member 35 in the pump becomes more stable.

Since the pipe member 39 is made as a separate part from the connecting tube member 35 and the housing 11, it becomes easier to increase accuracy of processing dimension and surface roughness at the upper and lower ends of the pipe member 39, each of which is inserted into the connecting tube member 35 and the passage way 18 of the housing 11. As a result, sealing performance as well as working property may be increased. Furthermore, it becomes easier to respond to any design change of the connecting tube member 35.

The pipe member 39 may be preferably made of elastic material, so that the pipe member 39 may absorb variation of processing dimension for the housing 11 and the connecting tube member 35.

When it is supposed that a portion of the inner wall of the connecting tube member 35 may be broken and thereby an extraneous material may be generated, the case in which the pipe-shaped projection is inserted into the end of the connecting tube member 35 may be more advantageous than the case in which the one end of the connecting tube member 35 is inserted into the opening port, in view of preventing the extraneous material from getting mixed with the fuel in the fuel passage way 18 connected to the variable volume chamber.

As an alternative structure of the pipe member 39 shown in FIG. 10, a recessed portion may be formed at the upper end of the pipe member 39, as in a similar manner to that shown in FIG. 8, so that the outer end 361 of the connecting tube member 35 may be inserted into such recessed portion.

Although, in the above seventh to ninth embodiments (FIGS. 8 to 10), various modifications for connecting the first end of the connecting tube member 35 to the first opening port 33 are explained, the same ideas may be applied to the second end of the connecting tube member 35 so that the second end may be firmly connected to the second opening port 34 of the housing 11. In the case that the pipe member 39 is used for the first and second opening ports 33 and 34, either one of the pipe members 39 may be preferably made of the elastic material.

Tenth to Twelfth Embodiments

Figure 11:
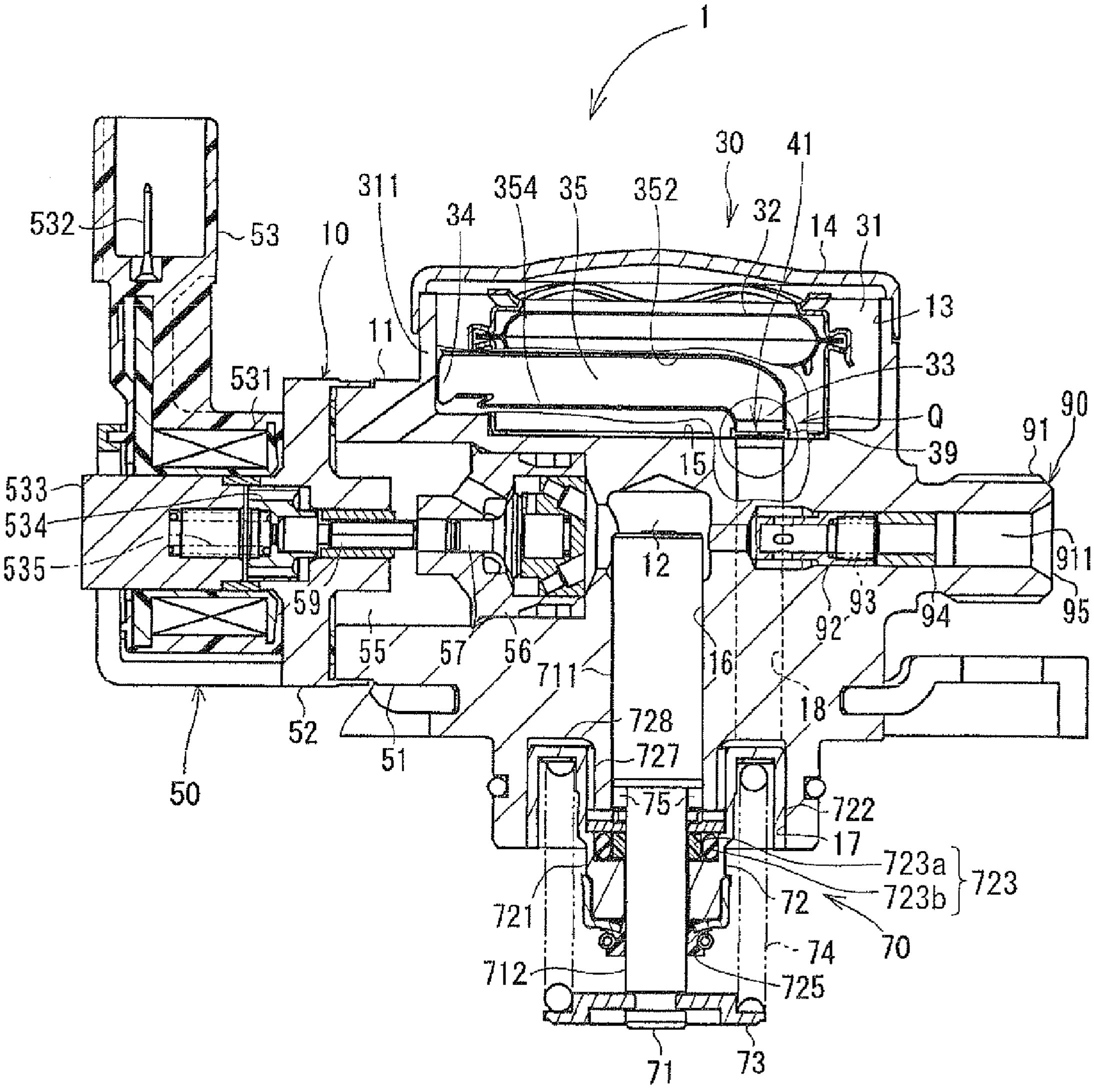
FIG. 11 is a schematic cross sectional view showing a high pressure pump, to which a tenth to a twelfth embodiment of the present invention may be applied.
Figure 12A:
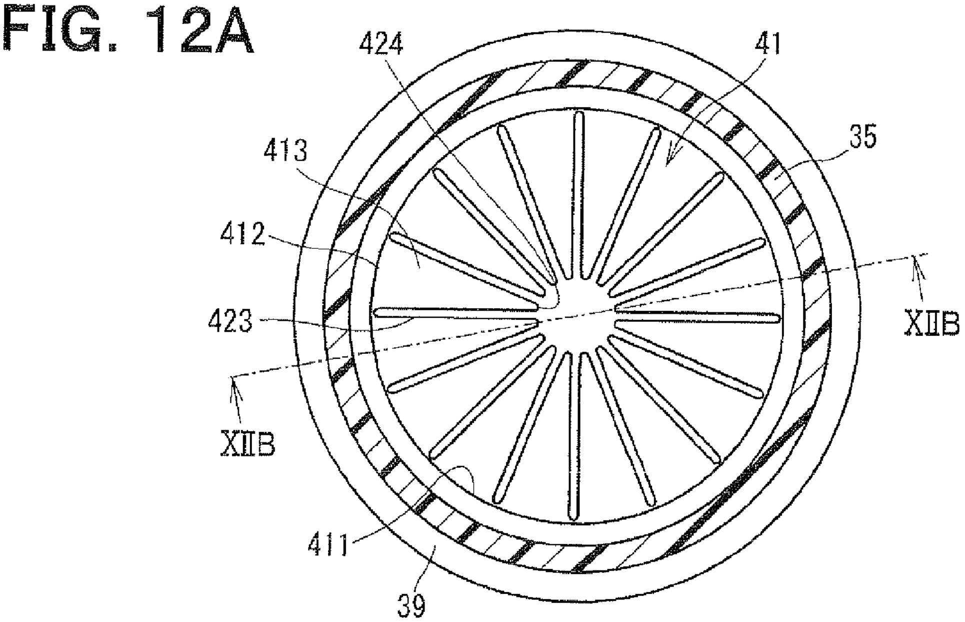
FIG. 12A is a schematic top plan view showing a pipe member having an elastically deforming portion according to the tenth embodiment of the present invention.
Figure 12B:
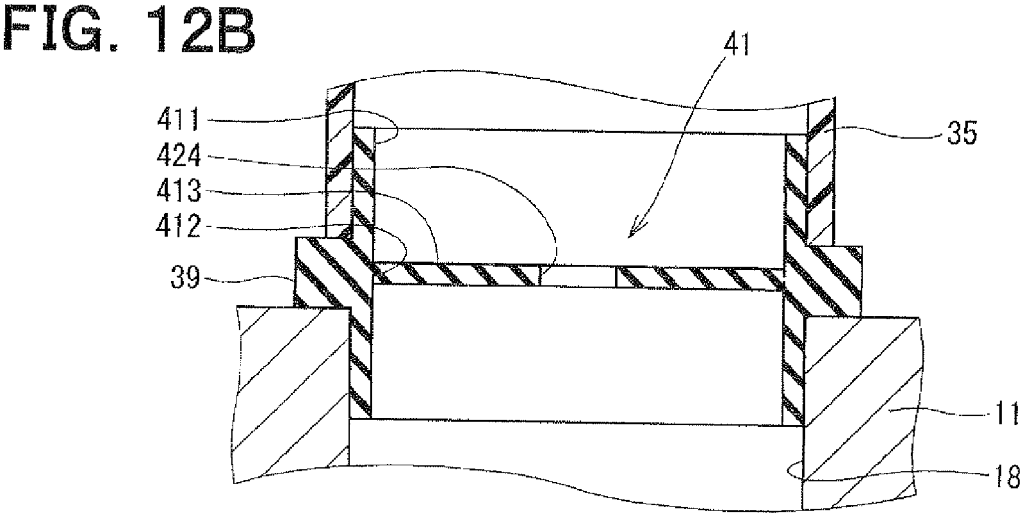
FIG. 12B is a schematic cross sectional view taken along a line XIIB-XIIB in FIG. 12A.
Figure 12C:
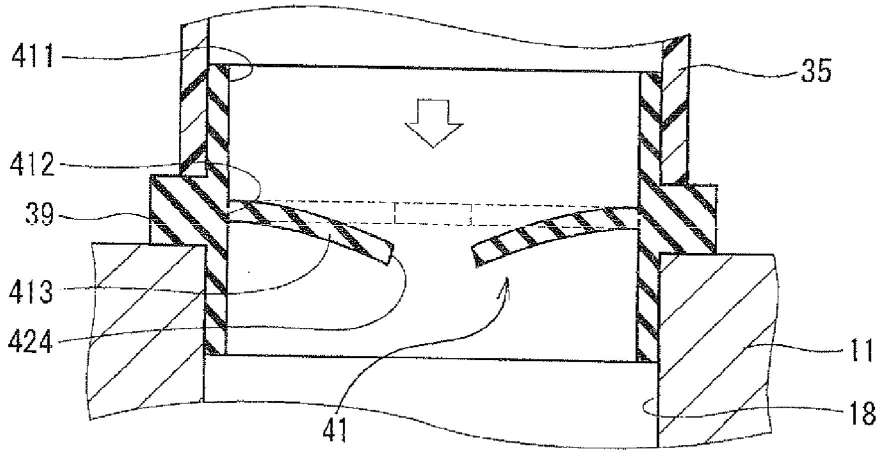
FIG. 12C is a schematic cross sectional view showing the pipe member in an elastically deformed condition.
Figure 13A:
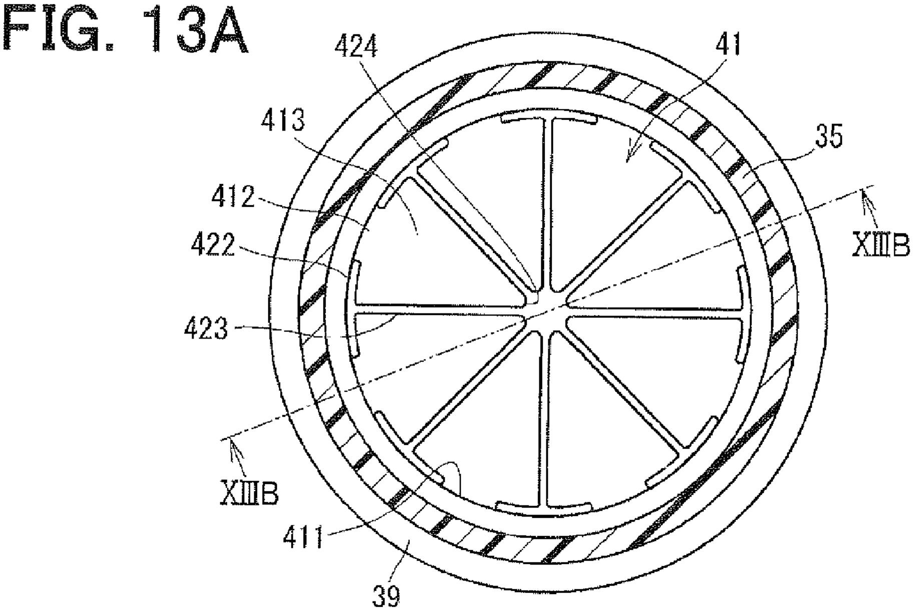
FIG. 13A is a schematic top plan view showing a pipe member having an elastically deforming portion according to the eleventh embodiment of the present invention.
Figure 13B:
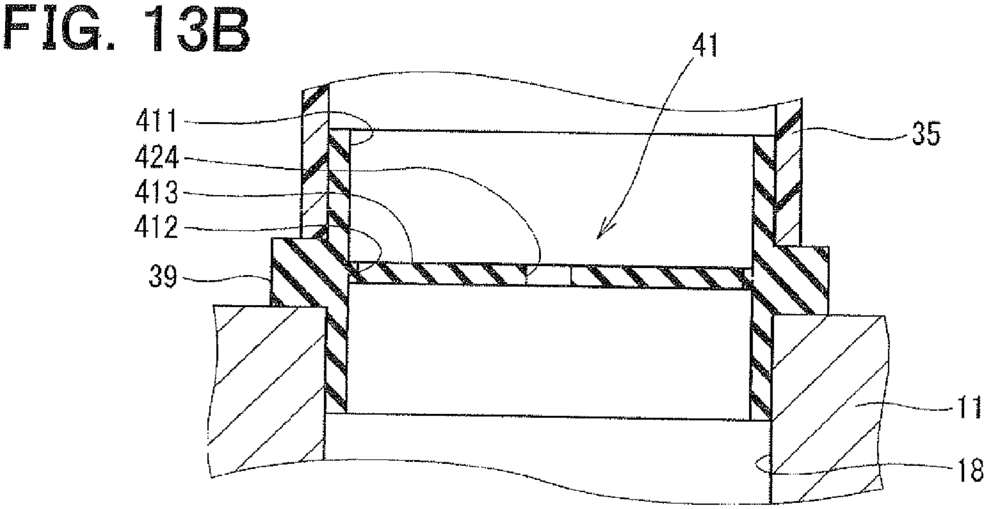
FIG. 13B is a schematic cross sectional view taken along a line XIIIB-XIIIB in FIG. 13A.
Figure 13C:
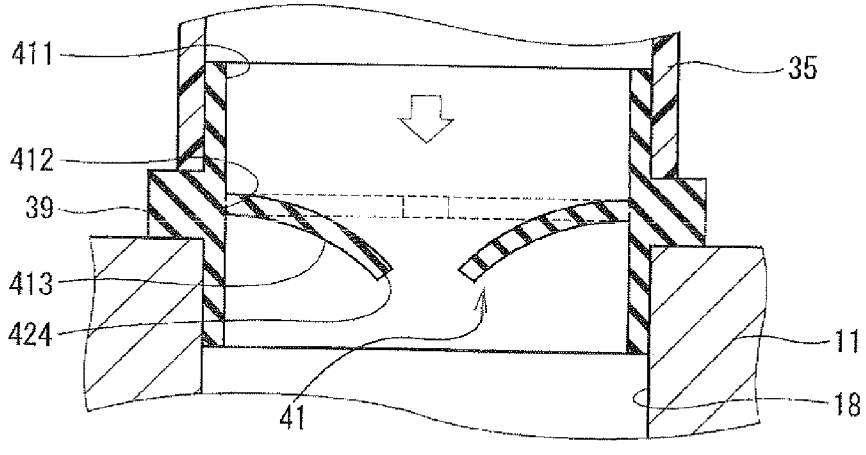
FIG. 13C is a schematic cross sectional view showing the pipe member in an elastically deformed condition.
Figure 14A:
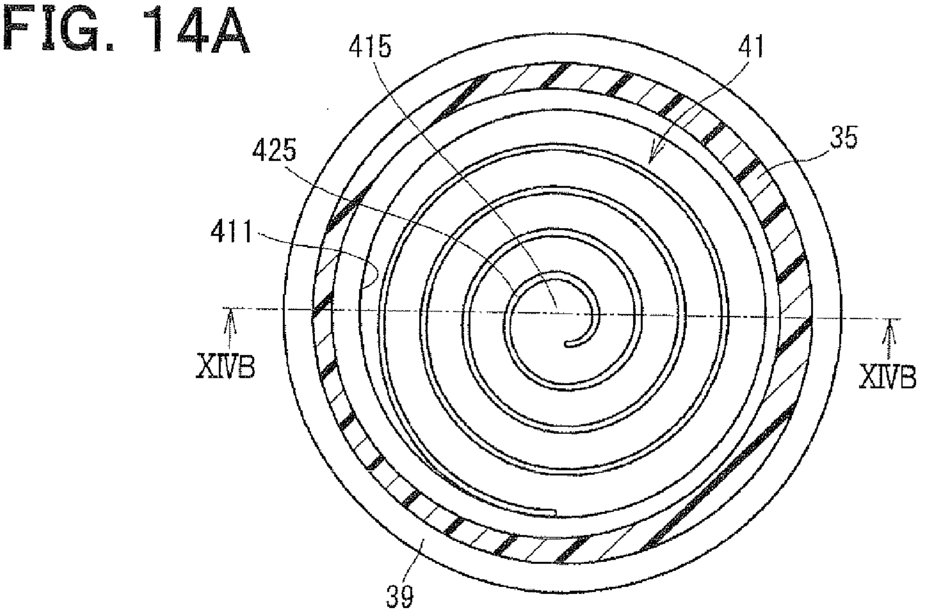
FIG. 14A is a schematic top plan view showing a pipe member having an elastically deforming portion according to the twelfth embodiment of the present invention.
Figure 14B:
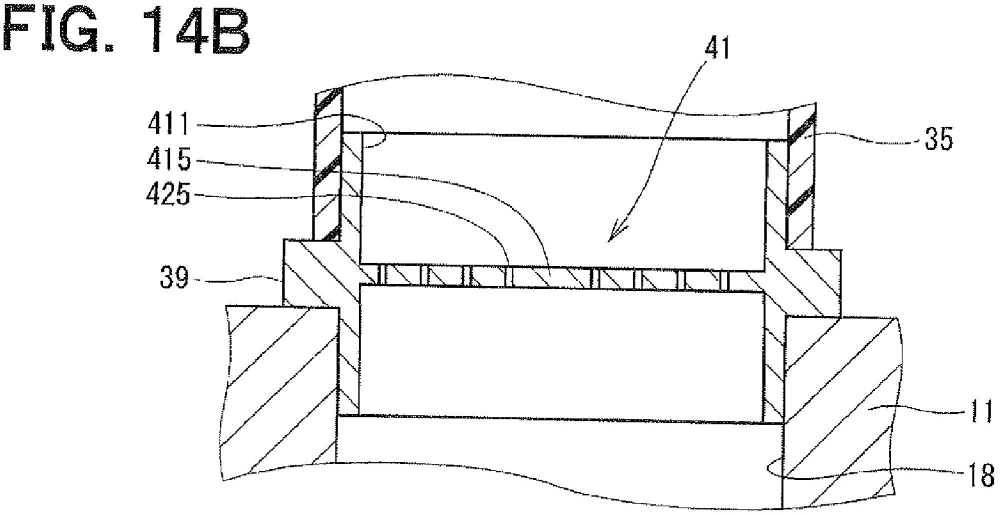
FIG. 14B is a schematic cross sectional view taken along a line XIVB-XIVB in FIG. 14A.
Figure 14C:
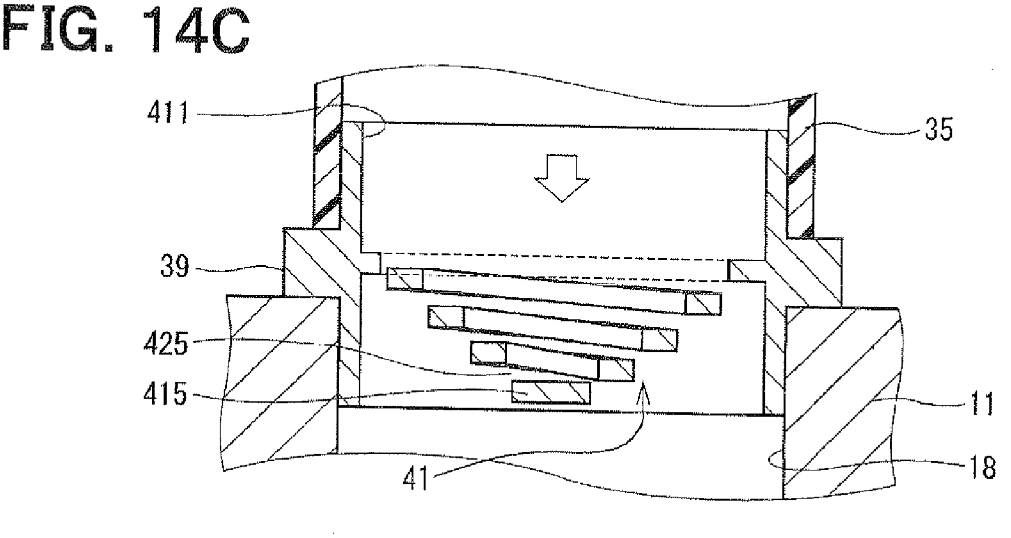
FIG. 14C is a schematic cross sectional view showing the pipe member in an elastically deformed condition.

In FIGS. 11 to 14, a further modified pipe member 39 made of the elastic material is shown. FIG. 11 is a schematic cross sectional view showing a high pressure pump 1, to which a tenth to a twelfth embodiment of the present invention may be applied. Each of FIGS. 12 to 14 shows the pipe member 39 having an elastically deforming portion 41 made of the elastic material, wherein each of FIGS. 12B, 13B and 14B is an enlarged cross sectional view of a portion Q of FIG. 11.

According to the tenth embodiment (FIGS. 12A to 12C), the pipe member 39 is made of rubber. As shown in FIG. 12A, the elastically deforming portion 41 of the pipe member 39 has multiple fin portions 413, which are divided into 16 pieces by radial slits 423. Each of the fin portions 413 is made of a thin film connected to an inner wall 411 at a root portion 412. There is formed a center aperture 424 at a center of the fin portions 413.

When the fuel flow does not exist, the fin portions 413 are held at positions shown in FIG. 12B, wherein each of the fin portions 413 extends in a radial direction from the root portion 424 at a right angle to the inner wall 411. During the fuel amount adjusting stroke, the fuel flows through the connecting tube member 35 and the passage way 18 from an upper portion toward a lower portion in FIG. 12C, as indicated by an arrow. In this situation, the fin portions 413 are pushed downwardly by the fuel flow and elastically bent, wherein the root portion 412 is working as a supporting point. As a result, the center aperture 424 is expanded to ensure a necessary fuel flow area. In addition, the fuel loses its energy of movement as a result of pushing and elastically bending the fin portions 413, so that the flow speed of the fuel is decreased. On the other hand, during the suction stroke, the fuel flows in the reversed direction from the lower portion toward the upper portion in FIG. 12C, the fin portions 413 are elastically bent in the opposite direction (in the upward direction).

As above, the fuel slowly flows through the connecting tube member 35 and the fuel may be slowly discharged from the connecting tube member 35 into the fuel gallery 31, so that the pressure pulsation in the fuel gallery 31 can be suppressed.

According to the eleventh embodiment (FIGS. 13A to 13C), the pipe member 39 is also made of rubber.

As shown in FIG. 13A, the elastically deforming portion 41 of the pipe member 39 has multiple fin portions 413, which are divided into 8 pieces by radial slits 423. Each of the fin portions 413 is made of a thin film connected to the inner wall 411 at the root portion 412. A pair of cut-in portions 422 is formed at the respective root portion 412 in a circumferential direction, so that a circumferential length of the root portion 412 is made smaller. There is also formed the center aperture 424 at the center of the fin portions 413, wherein an area of the center aperture 424 in FIG. 13A is made smaller than that of the tenth embodiment shown in FIG. 12A.

The function of the fin portions 413 of the eleventh embodiment (FIG. 13A) is the same to that of the tenth embodiment (FIG. 12A). According to the eleventh embodiment, the area of the fin portion 413 is larger than that of the tenth embodiment, while the circumferential length of the root portion 412 of the eleventh embodiment is the same to that of the tenth embodiment, because of the cut-in portions 422. As a result, the fin portions 413 of FIG. 13A are elastically deformed more largely than the fin portions of FIG. 12A, so that the center aperture 424 (FIG. 13C) is expanded to almost the same level to that of FIG. 12C so as to ensure the necessary fuel flow. As in the same manner to the tenth embodiment, the fuel loses its energy of movement as a result of pushing and elastically bending the fin portions 413, so that the flow speed of the fuel is decreased.

Then, the fuel slowly flows through the connecting tube member 35 and the fuel may be slowly discharged from the connecting tube member 35 into the fuel gallery 31, so that the pressure pulsation in the fuel gallery 31 can be suppressed.

According to the twelfth embodiment (FIGS. 14A to 14C), the pipe member 39 is made of resilient metal. As shown in FIG. 14A, the elastically deforming portion 41 of the pipe member 39 has a spiral spring member 415 extending from a center to the inner wall 411 of the pipe member 39. The spiral spring member 415 is made of a thin metal sheet cut by a spiral slit 425. An outer end of the spiral spring member 415 is connected to the inner wall 411 of the pipe member 39.

When the fuel flow does not exist, the spiral spring member 415 is held at a position shown in FIG. 14B, wherein the spiral spring member 415 extends in a radial direction from a root portion at a right angle to the inner wall 411. During the fuel amount adjusting stroke, the fuel flows through the connecting tube member 35 and the passage way 18 from an upper portion toward a lower portion in FIG. 14C, as indicated by an arrow. In this situation, the spiral spring member 415 is pushed downwardly by the fuel flow and elastically deformed. As a result, the spiral spring member 415 as well as the spiral slit 425 is expanded in an axial direction to ensure a necessary fuel flow area. In addition, the fuel loses its energy of movement as a result of pushing and elastically deforming the spiral spring member 415, and thereby the flow speed of the fuel is decreased. On the other hand, during the suction stroke, the fuel flows in the reversed direction from the lower portion toward the upper portion in FIG. 14C, the spiral spring member 415 is elastically deformed in the opposite direction (in the upward direction).

As a result, the fuel slowly flows through the connecting tube member 35 and the fuel may be slowly discharged from the connecting tube member 35 into the fuel gallery 31, so that the pressure pulsation in the fuel gallery 31 can be suppressed.

Thirteenth to Fifteenth Embodiments

Figure 15:
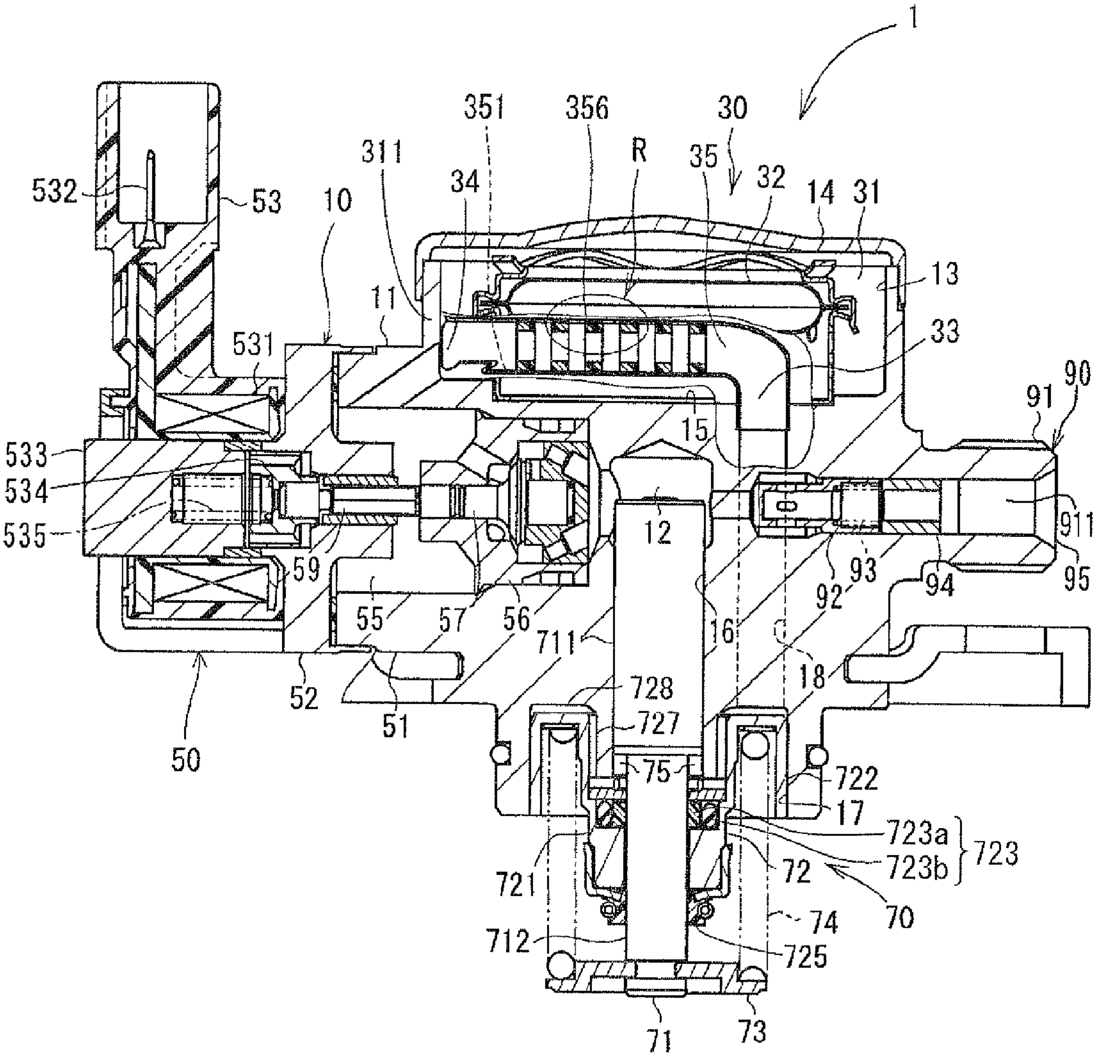
FIG. 15 is a schematic cross sectional view showing a high pressure pump according to a thirteenth embodiment of the present invention.

FIG. 15 is a schematic cross sectional view showing a high pressure pump according to a thirteenth embodiment of the present invention. In FIG. 15, an inside of the connecting tube member 35 is provided with a concave-convex surface in a radial direction.

Figure 16A:
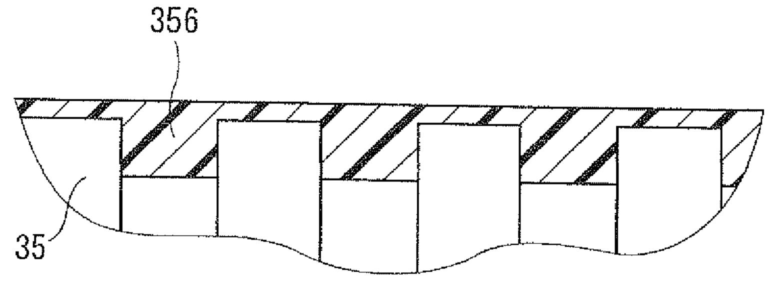
FIG. 16A is an enlarged schematic view showing a portion R shown in FIG. 15.

The communication through-holes 351 are formed at the lower wall of the connecting tube member 35 at a position closer to the second opening port 34, as in the same or similar manner to the first embodiment (FIG. 1A), for example. At a portion of the connecting tube member 35, which is on a side toward the first opening port 33 from the connecting through-holes 351, namely at an intermediate portion of the connecting tube member 35, a concave-convex surface 356 is formed at an inner surface. FIG. 16A is an enlarged schematic view showing a portion R shown in FIG. 15, wherein a cross sectional shape of the concave-convex surface 356 is rectangular.

Figure 16B:
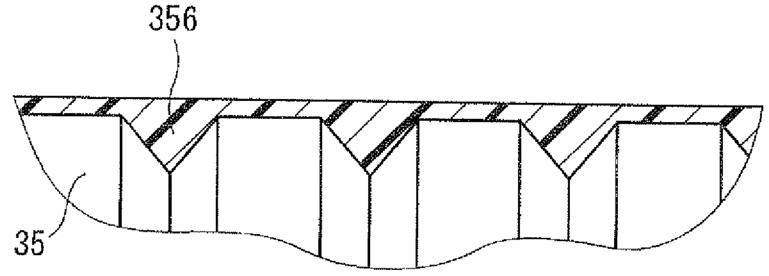
FIG. 16B is an enlarged schematic cross sectional view showing a portion corresponding to that of FIG. 16A according to a fourteenth embodiment of the present invention.
Figure 16C:
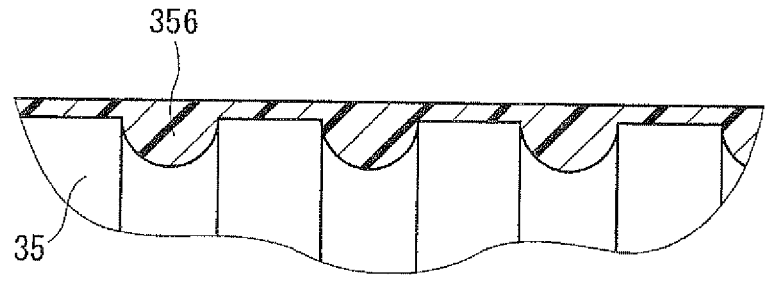
FIG. 16C is an enlarged schematic cross sectional view showing a portion corresponding to that of FIG. 16A according to a fifteenth embodiment of the present invention.

According to a fourteenth embodiment shown in FIG. 16B, across sectional shape of the concave-convex surface 356 is triangular. According to a fifteenth embodiment shown in FIG. 16C, a cross sectional shape of the concave-convex surface 356 is semicircular. The concave-convex surface 356 may be formed by a bellow-shaped tube member.

According to the connecting tube member 35 having the concave-convex surface 356 in the radial direction, when the fuel flow runs against the inner surface of the concave-convex surface 356, a vortex flow is generated and at the same time the energy of movement of the fuel is lost, and finally the flow speed of the fuel is decreased. As a result, the fuel slowly flows through the connecting tube member 35 and the fuel may be slowly discharged from the connecting tube member 35 into the fuel gallery 31, so that the pressure pulsation in the fuel gallery 31 can be suppressed.

Sixteenth Embodiment

Figure 17:
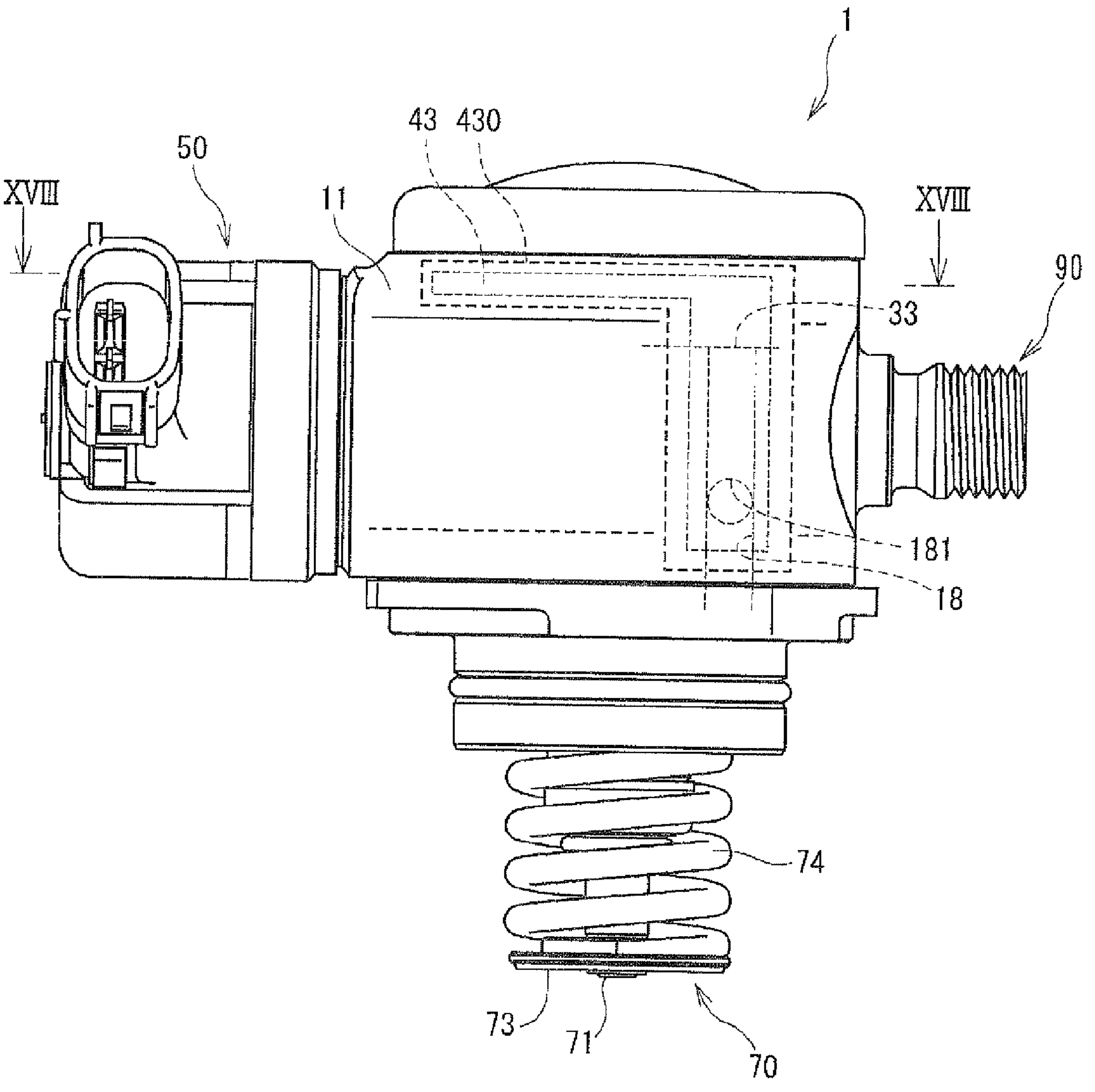
FIG. 17 is a front elevation view showing a high pressure pump according to a sixteenth embodiment of the present invention.
Figure 18A:
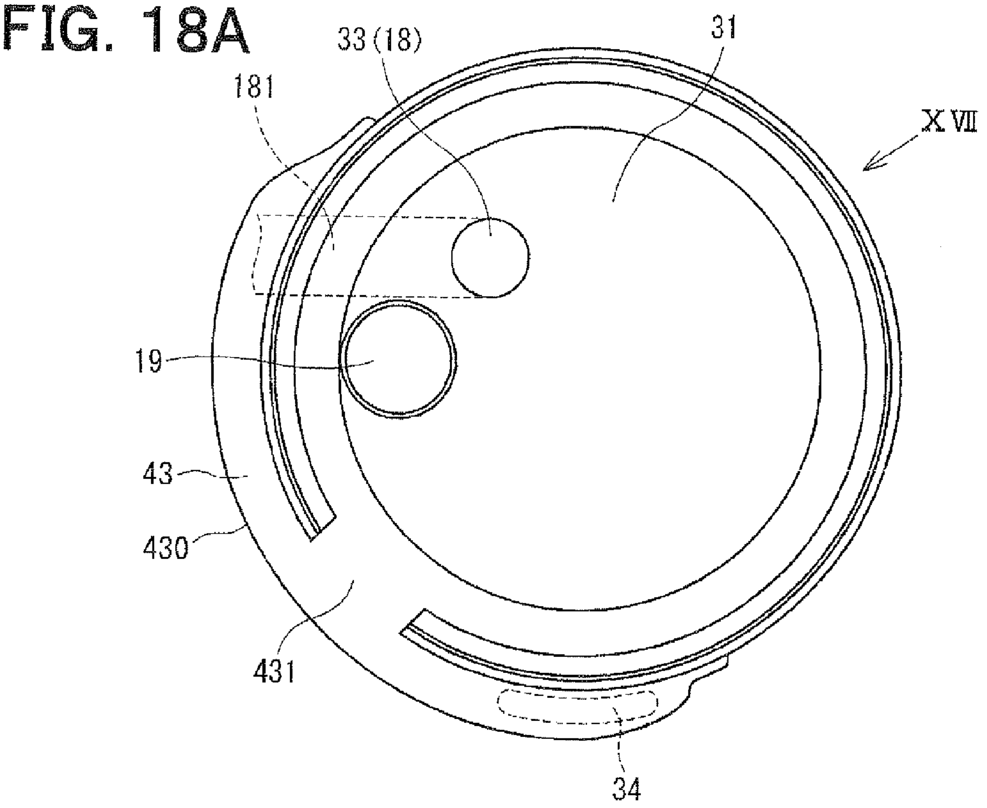
FIG. 18A is a schematic view showing the high pressure pump according to the sixteenth embodiment of the present invention, when viewed from a top side.
Figure 18B:
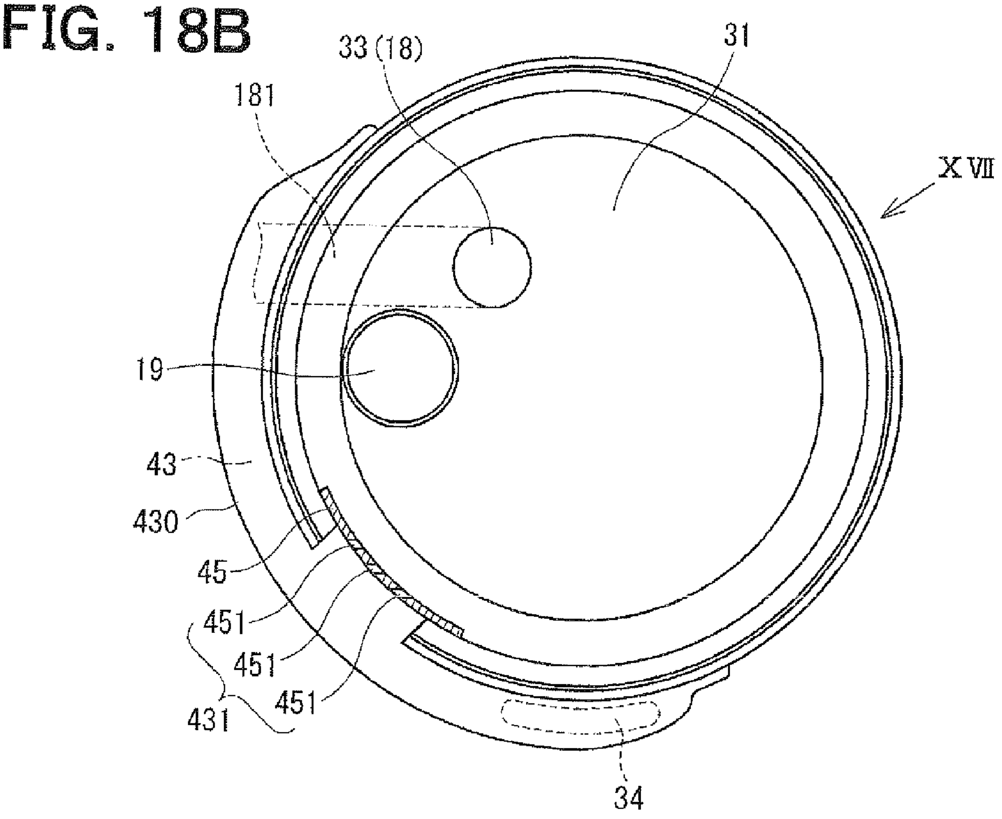
FIG. 18B is a schematic view showing the high pressure pump according to a modification of the sixteenth embodiment of the present invention, when viewed from a top side.

FIGS. 17 and 18 show a high pressure pump 1 according to a sixteenth embodiment of the present invention. FIG. 17 is a side view of the high pressure pump 1 when viewed in a direction of an arrow XVII shown in FIG. 18A and FIG. 18B. The high pressure pump 1 has a bypass member 430 (indicated by a dotted line in FIG. 17). The bypass member 430 is provided at the housing 11 at a side opposite to a sheet of the drawing of FIG. 17 (at a back side of FIG. 17).

FIGS. 18A and 18B are schematic views of the high pressure pump, when viewed from a top side in FIG. 17 and an upper portion of the pump above a line XVIII-XVIII is taken away. A bypass passage 181 is formed in the housing 11, which is below the bottom surface of the fuel gallery 31.

According to the present embodiment, the bypass member 430 is formed at an outside of the housing 11. The bypass member 430 forms therein a bypass passage 43 which communicates the first and second opening ports 33 and 34 with each other. The bypass passage 43 is formed at an outside of the fuel gallery 31. The bypass passage 181 formed in the housing 11 communicates the passage way 18 with the bypass passage 43.

The bypass member 430 may be made of a flexible or a rigid tube member. According to the structure of the present embodiment, there are less constrains in terms of a space, when compared with the case in which the connecting tube member 35 is provided in the fuel gallery 31. Therefore, it has higher design flexibility. In addition, it becomes much easier to carry out maintenance work.

As shown in FIG. 18A, the bypass member 430 has a communication passage 431 at an intermediate portion between the first and second opening ports 33 and 34, so that the bypass passage 43 is communicated to the fuel gallery 31. As a result, a part of the fuel flowing through the bypass passage 43 may flow into the fuel gallery 31.

As shown in FIG. 18B, which is a modification of the embodiment shown in FIG. 18A, a separation plate 45 may be provided at the communication passage 431. Multiple communication through-holes 451 may be formed in the separation plate 45, which is fixed to the housing 11 so as to separate the inside and outside of the fuel gallery 31 from each other.

Seventeenth Embodiment

Figure 19:
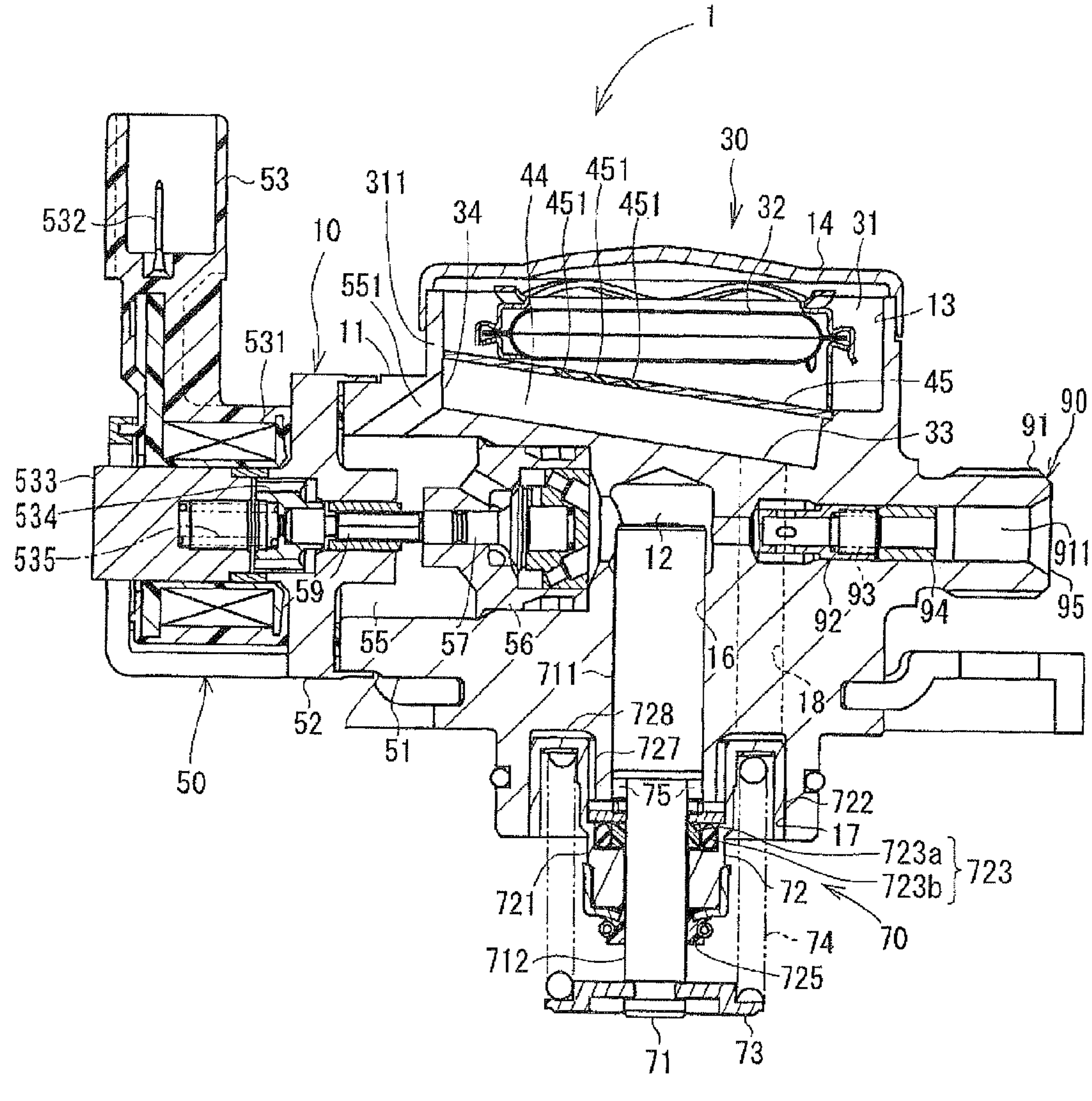
FIG. 19 is a schematic cross sectional view showing a high pressure pump according to a seventeenth embodiment of the present invention.
Figure 20A:
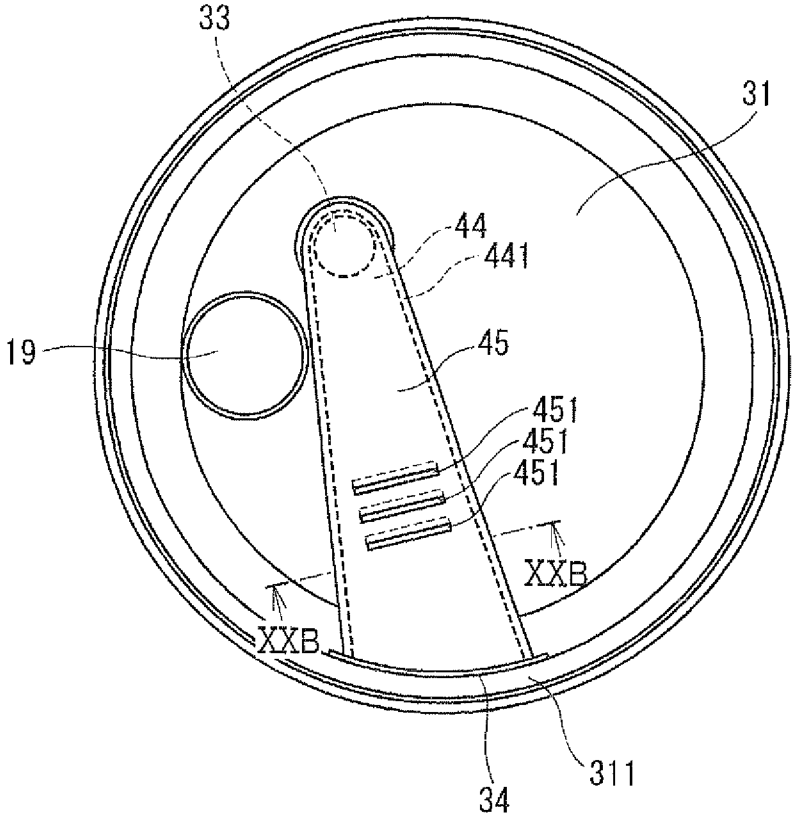
FIG. 20A is a schematic view showing the high pressure pump according to the seventeenth embodiment of the present invention, when viewed from a top side.
Figure 20B:
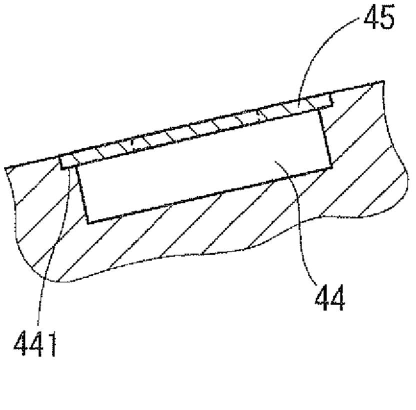
FIG. 20B is a schematic cross sectional view taken along a line XXB-XXB in FIG. 20A.

FIGS. 19 and 20 show a high pressure pump according to a seventeenth embodiment of the present invention. According to the present embodiment, a fuel communication passage 44 of a groove shape is formed at the bottom portion of the fuel gallery 31 of the housing 11. The fuel communication passage 44 communicates the first and second opening ports 33 and 34 with each other. The second opening port 34 is communicated with the fuel passage way 55 through the inclined fuel passage 551.

As shown in FIG. 19, the bottom of the fuel gallery 31 on a side closer to the second opening port 34 is higher than the bottom on a side closer to the first opening port 33, in order to avoid any interference with the fuel passage way 55, in which the seat body 56 is accommodated. The bottom closer to the first opening port 33 is formed at a position as low as possible, so that the bottom closer to the first opening port 33 is further away from the pulsation damper 32. The fuel communication passage 44 is straightly inclined. However, it may be inclined in a stepwise manner.

A stepped portion 441 is formed at an edge of the fuel communication passage 44. The separation plate 45 is attached to the stepped portion 441 to cover the groove-shaped fuel communication passage 44. The separation plate 45 separates the fuel communication passage 44 from the fuel gallery 31.

Multiple (three) communication through-holes 451 (slit-shape holes) are formed in the separation plate 45 at such a position closer to the second opening port 34. Each of the through-holes 451 is inclined such that an axis of the through-hole is inclined toward the first opening port 33 at a predetermined angle (e.g. 60 degrees) with respect to a line perpendicular to the surface of the separation plate 45, when the axis extends from the upper side to the lower side of the separation plate 45.

Accordingly, as in the manner way to the through-holes 351 of the first embodiment (FIGS. 2A and 2B), the fuel (which is discharged from the fuel communication passage 44 through the communication through-holes 451 during the fuel amount adjusting stroke) flows out into the fuel gallery 31 at an angle of 150 degrees with respect to the fuel direction from the second opening port 34 toward the first opening port 33. Therefore, fuel flow-out resistance becomes larger than the case in which the through-holes 451 are formed in the separation plate 45 at right angle (90 degrees) to the surface thereof, so that the fuel discharge from the fuel communication passage 44 into the fuel gallery 31 may be suppressed.

According to the present embodiment, since the fuel communication passage 44 of the groove-shape is formed at the bottom of the fuel gallery 31, a number of assembling process can be reduced when compared with the case in which the fuel communication passage is formed by the tube member 35 or the bypass member 430. In addition, factors for variation (which would occur when large number of parts are assembled and connected together) are reduced so that quality can be stabilized.

Since the communication through-holes 451 are formed in the separation plate 45 on the side closer to the second opening port 34, the fuel flow from the through-holes 451 may hardly and directly affect to the pulsation damper 32 (which is located at the center of the fuel gallery 31) and/or the fuel inlet port 19 (which is provided at the position closer to the first opening port 33). As a result, the pressure pulsation can be suppressed.

In addition, since the communication through-holes 451 are inclined at the predetermined angle with respect to the line perpendicular to the separation plate 45, it is possible to adjust the fuel flow-out resistance for the fuel flowing from the fuel communication passage 44 into the fuel gallery 31.

Eighteenth Embodiment

Figure 21:
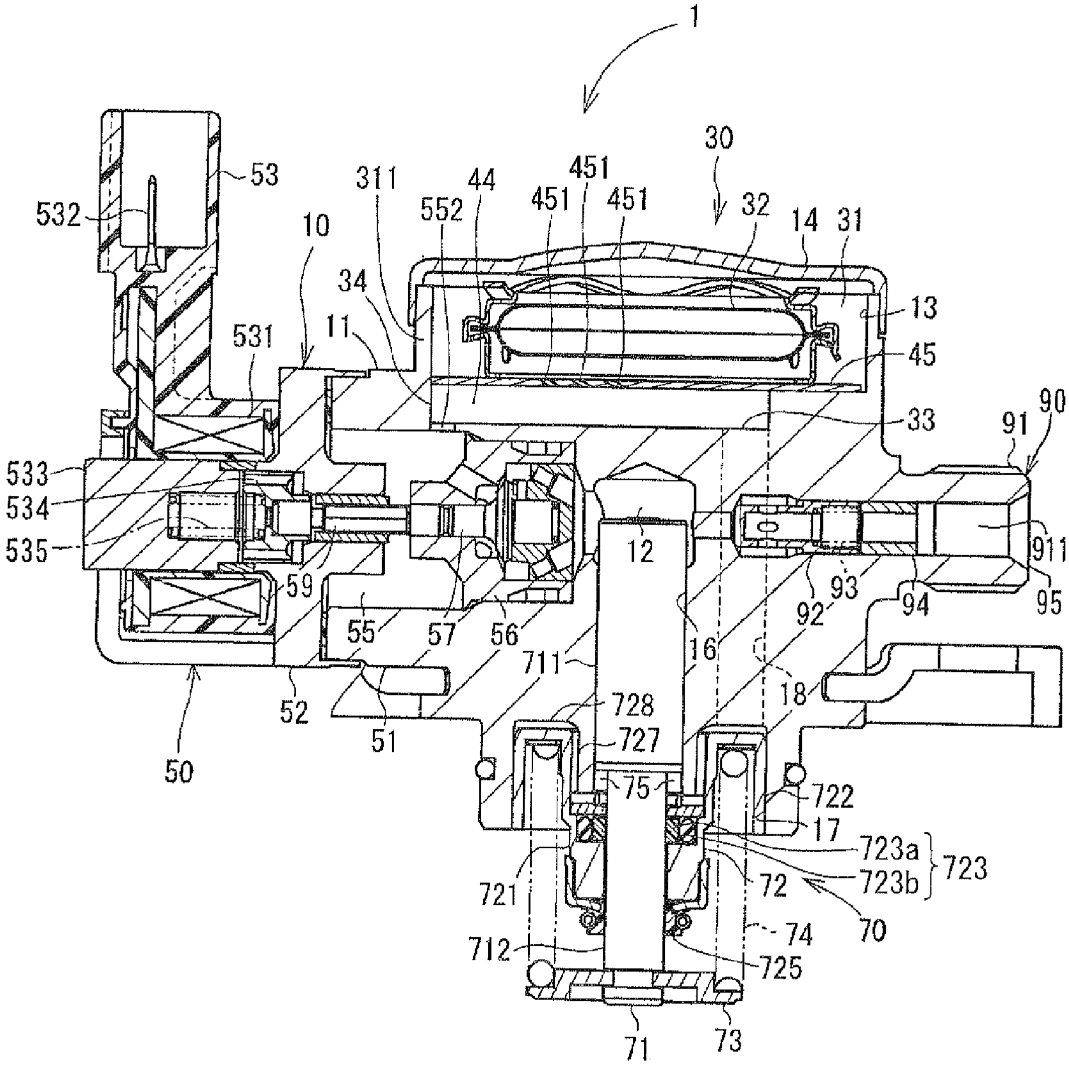
FIG. 21 is a schematic cross sectional view showing a high pressure pump according to an eighteenth embodiment of the present invention.

FIG. 21 shows a high pressure pump according to an eighteenth embodiment of the present invention. The present embodiment is different from the seventeenth embodiment (FIGS. 19 and 20) in that the fuel communication passage 44 is provided in an almost horizontal direction and a fuel passage 552 is formed in a vertical direction (not in an inclined direction). When there is a sufficient wall thickness around the seat body 56, the fuel communication passage 44 can be formed in the horizontal direction, which would make the manufacturing process simpler.

Other Embodiments or Modifications

The connecting tube member 35 may not be limited to a cross section of the rectangular shape. For example, the cross section may be in the form of a triangular.

The present invention should not be limited to the above embodiments. A various kinds of modification can be made without departing from the scope of the invention.

What is claimed is:

1. A high pressure pump for an internal combustion engine comprising:
- a housing having a fuel gallery;
- a plunger having a large-diameter portion and a small-diameter portion and movably accommodated in a cylinder formed in the housing, so that a fuel pressurizing chamber is formed in the cylinder at a side of the large-diameter portion of the plunger and a variable volume chamber is formed in the cylinder at the small-diameter portion of the plunger;
- a fuel inlet port formed in the housing and opening to the fuel gallery for supplying fuel into the fuel gallery;
- a first opening port formed in the housing and opening to the fuel gallery, the first opening port being communicated to the variable volume chamber through a first fuel passage way formed in the housing;
- a second opening port formed in the housing and opening to the fuel gallery, the second opening port being communicated to the fuel pressurizing chamber through a second fuel passage way formed in the housing;
- a suction valve provided in the second fuel passage way;
- a fuel outlet valve for discharging the fuel pressurized by the fuel pressurizing chamber;
- a connecting tube member provided in the fuel gallery for communicating the first and second opening ports with each other; and
- a communication through-hole formed in the connecting tube member so as to communicate an inside of the connecting tube member with the fuel gallery.

2. The high pressure pump according to the claim 1, wherein
- the communication through-hole is formed in the connecting tube member at a position closer to the second opening port, and
- the communication through-hole is directed in such a direction other than a direct direction, in which the communication through-hole faces to the fuel inlet port opening to the fuel gallery.

3. The high pressure pump according to the claim 1, wherein
- the connecting tube member has a curved portion in a fuel flow direction, and
- the communication through-hole is formed in a wall of the connecting tube member other than an outer-side wall of the curved portion.

4. The high pressure pump according to the claim 1, wherein
- the communication through-hole has a cross section of a rectangular shape.

5. The high pressure pump according to the claim 4, wherein
- the communication through-hole is composed of multiple slit-shaped holes.

6. The high pressure pump according to the claim 5, wherein
- the communication through-hole has an axis inclined at a predetermined angle with respect to a line perpendicular to a surface of the wall of the connecting tube member.

7. The high pressure pump according to the claim 1, wherein
- a large-diameter recessed portion is formed at one of the first and second opening ports of the housing, so that one of outer ends of the connecting tube member is inserted into an inner wall of the recessed portion until a forward end of the connecting tube member is brought into contact with a stepped portion formed at a bottom of the recessed portion.

8. The high pressure pump according to the claim 1, wherein
- a pipe-shaped projection is formed at one of the first and second opening ports of the housing, so that the pipe-shaped projection is inserted into one of inner ends of the connecting tube member until a forward end of the connecting tube member is brought into contact with a stepped portion formed at a bottom around the pipe-shaped projection.

9. The high pressure pump according to the claim 1, wherein
- a pipe member, which is formed as a separate part from the housing, is inserted at its one end into one of the first and second opening ports of the housing, and
- the other end of the pipe member is inserted into an inner wall of the connecting tube member.

10. The high pressure pump according to the claim 9, wherein the pipe member is made of elastic material.

11. The high pressure pump according to the claim 10, wherein the pipe member has an elastically deforming portion for decreasing flow speed of fuel flowing through the pipe member.

12. The high pressure pump according to the claim 1, wherein a concave-convex surface is formed at an inner surface of the connecting tube member.

13. A high pressure pump comprising:

a housing having a fuel inlet port for supplying fuel, a first opening port communicated to a variable volume chamber and a second opening port communicated to a fuel pressurizing chamber, the housing forming a fuel gallery facing to each of the ports, and the housing having a fuel passage for communicating the second opening port to the fuel pressurizing chamber wherein a suction valve is provided in the fuel passage;

a plunger having a large-diameter portion for generating volume change in the fuel pressurizing chamber, the plunger having a small-diameter portion integrally formed with the large-diameter portion on a side opposite to the fuel pressurizing chamber, wherein the small-diameter portion has a diameter smaller than that of the large-diameter portion;

a fuel outlet valve for discharging fuel pressurized in the fuel pressurizing chamber;

a chamber forming member attached to the housing around the plunger, so that the variable volume chamber is formed around the small-diameter portion; and a connecting tube member provided in the fuel gallery for communicating the first and second opening ports with each other, wherein the connecting tube member has a communication through-hole for communicating an inside of the connecting tube member with the fuel gallery, so that the inside of the connecting tube member is not separated from a space formed in the fuel gallery.

14. The high pressure pump according to claim 13, wherein the communication through-hole is formed in the connecting tube member at a position closer to the second opening port, and the communication through-hole is directed in such a direction other than a direct direction, in which the communication through-hole faces to the fuel inlet port opening to the fuel gallery.

15. The high pressure pump according to the claim 13, wherein the connecting tube member has a curved portion in a fuel flow direction, and the communication through-hole is formed in a wall of the connecting tube member other than an outer-side wall of the curved portion.

16. The high pressure pump according to the claim 13, wherein the communication through-hole has a cross section of a rectangular shape.

17. The high pressure pump according to the claim 16, wherein the communication through-hole is composed of multiple slit-shaped holes.

18. The high pressure pump according to the claim 17, wherein the communication through-hole has an axis inclined at a predetermined angle with respect to a line perpendicular to a surface of the wall of the connecting tube member.

19. The high pressure pump according to the claim 13, wherein a large-diameter recessed portion is formed at one of the first and second opening ports of the housing, so that one of outer ends of the connecting tube member is inserted into an inner wall of the recessed portion until a forward end of the connecting tube member is brought into contact with a stepped portion formed at a bottom of the recessed portion.

20. The high pressure pump according to the claim 13, wherein a pipe-shaped projection is formed at one of the first and second opening ports of the housing, so that the pipe-shaped projection is inserted into one of inner ends of the connecting tube member until a forward end of the connecting tube member is brought into contact with a stepped portion formed at a bottom around the pipe-shaped projection.

21. The high pressure pump according to the claim 13, wherein a pipe member, which is formed as a separate part from the housing, is inserted at its one end into one of the first and second opening ports of the housing, and the other end of the pipe member is inserted into an inner wall of the connecting tube member.

22. The high pressure pump according to the claim 21, wherein the pipe member is made of elastic material.

23. The high pressure pump according to the claim 22, wherein the pipe member has an elastically deforming portion for decreasing flow speed of fuel flowing through the pipe member.

24. The high pressure pump according to the claim 13, wherein a concave-convex surface is formed at an inner surface of the connecting tube member.

* * * * *